(12) United States Patent
Grimm et al.

(10) Patent No.: US 9,738,456 B1
(45) Date of Patent: Aug. 22, 2017

(54) CONVEYOR BELT CLEANER

(71) Applicant: Superior Industries, Inc., Morris, MN (US)

(72) Inventors: Lafe Grimm, Hancock, MN (US); Paul D. Schmidgall, Morris, MN (US)

(73) Assignee: Superior Industries, Inc., Morris, MN (US)

(*) Notice: Subject to any disclaimer, the term of this patent is extended or adjusted under 35 U.S.C. 154(b) by 0 days.

(21) Appl. No.: 15/226,887

(22) Filed: Aug. 2, 2016

(51) Int. Cl.
*B65G 45/16* (2006.01)
*B65G 45/12* (2006.01)

(52) U.S. Cl.
CPC ............ *B65G 45/16* (2013.01); *B65G 45/12* (2013.01)

(58) Field of Classification Search
CPC ......... B65G 45/16; B65G 45/12; B65G 45/14
USPC ................................................. 198/497–499
See application file for complete search history.

(56) References Cited

U.S. PATENT DOCUMENTS

| | | | |
|---|---|---|---|
| 607,656 A | 7/1898 | Dixon | |
| 3,598,231 A | 8/1971 | Matson | |
| 3,722,667 A | 3/1973 | Olson | |
| 3,782,534 A | 1/1974 | Holleman | |
| 4,189,046 A | 2/1980 | Ward et al. | |
| 4,202,437 A | 5/1980 | Gordon | |
| 4,269,301 A | 5/1981 | Gibbs | |
| 4,402,394 A | 9/1983 | Stoll | |
| 4,529,084 A | 7/1985 | Zhang | |
| 4,533,036 A | 8/1985 | Gordon | |
| 4,586,600 A | 5/1986 | Lindbeck | |
| 4,779,119 A | 10/1988 | Kaieda | |
| 4,795,024 A | 1/1989 | Eatwell | |
| 4,836,356 A | 6/1989 | Mukai et al. | |
| 4,850,474 A | 7/1989 | Schwarze | |
| 4,936,439 A | 6/1990 | Alexander, Jr. et al. | |
| 4,953,689 A | 9/1990 | Peterson et al. | |
| 4,969,553 A | 11/1990 | Stoll | |
| 5,016,746 A | 5/1991 | Gibbs | |
| 5,149,305 A | 9/1992 | Gordon | |
| 5,197,587 A | 3/1993 | Malmberg | |
| 5,222,589 A | 6/1993 | Gordon | |
| 5,241,350 A | 8/1993 | Bigelow | |
| 5,301,797 A * | 4/1994 | Hollyfield, Jr. | ........ B65G 45/16 198/499 |
| D347,918 S | 6/1994 | Gibbs | |

(Continued)

FOREIGN PATENT DOCUMENTS

DE 29719469 U1 1/1999
DE 19748070 B4 3/2004

(Continued)

OTHER PUBLICATIONS

Martin Engineering, "Martin QC1 Cleaner XHD Operator's Manual", 2015 (24 pages).

(Continued)

*Primary Examiner* — Gene Crawford
*Assistant Examiner* — Keith R Campbell
(74) *Attorney, Agent, or Firm* — Todd R. Fronek; Larkin Hoffman Daly & Lindgren, Ltd.

(57) ABSTRACT

Conveyor belt cleaners are disclosed having a scraper blade for removing aggregate material from a belt surface. Embodiments are disclosed in which a cleaner includes a tensioner assembly; in some embodiments a tensioner assembly comprises a tension adjustment subassembly.

20 Claims, 21 Drawing Sheets

(56) References Cited

U.S. PATENT DOCUMENTS

| | | | |
|---|---|---|---|
| 5,385,507 A | 1/1995 | Swearingen et al. | |
| 5,518,107 A | 5/1996 | Schwarze | |
| 5,865,997 A | 2/1999 | Isaacs | |
| 5,887,702 A | 3/1999 | Mott | |
| 5,950,803 A | 9/1999 | Schwarze | |
| 5,979,638 A | 11/1999 | Wiggins | |
| 5,992,614 A * | 11/1999 | Mott | B65G 45/16 198/499 |
| 6,056,112 A | 5/2000 | Wiggins | |
| 6,182,816 B1 | 2/2001 | Gibbs et al. | |
| 6,213,287 B1 | 4/2001 | Juracko | |
| 6,283,274 B1 | 9/2001 | Dolan et al. | |
| 6,315,105 B1 | 11/2001 | Gibbs et al. | |
| 6,354,428 B1 | 3/2002 | Gibbs et al. | |
| 6,374,991 B1 | 4/2002 | Swinderman | |
| 6,439,373 B1 * | 8/2002 | Swinderman | B65G 45/12 198/497 |
| 6,443,294 B1 | 9/2002 | Brody et al. | |
| 6,457,575 B2 | 10/2002 | Swinderman | |
| 6,575,292 B2 | 6/2003 | Swinderman | |
| D482,508 S | 11/2003 | DeVries | |
| 6,820,734 B1 | 11/2004 | Gilbert et al. | |
| 6,948,609 B2 * | 9/2005 | Finger | B65G 45/16 198/497 |
| 7,007,794 B2 | 3/2006 | Waters et al. | |
| D524,009 S | 6/2006 | Smith et al. | |
| 7,216,756 B2 | 5/2007 | Swinderman | |
| 7,308,980 B2 * | 12/2007 | Peterson | B65G 45/16 198/497 |
| 7,383,940 B1 | 6/2008 | Stumpf, Jr. et al. | |
| 7,441,647 B2 | 10/2008 | Wiggins et al. | |
| D594,623 S | 6/2009 | Felton | |
| 7,549,532 B2 | 6/2009 | Ostman | |
| 7,819,237 B2 | 10/2010 | Felton | |
| 8,028,819 B1 * | 10/2011 | Swinderman | B65G 45/16 198/494 |
| 8,123,022 B2 * | 2/2012 | Mott | B65G 45/12 198/497 |
| 8,393,459 B2 | 3/2013 | Childs et al. | |
| 8,485,344 B1 * | 7/2013 | Liland | B65G 45/16 198/499 |
| 8,776,990 B2 | 7/2014 | Felton et al. | |
| D756,060 S | 5/2016 | DeVries | |
| 2003/0066737 A1 | 4/2003 | Malmberg | |
| 2003/0230466 A1 | 12/2003 | Swinderman et al. | |
| 2004/0188224 A1 | 9/2004 | Kolodziej et al. | |
| 2006/0049023 A1 | 3/2006 | Dietsch et al. | |
| 2006/0131135 A1 | 6/2006 | Waters et al. | |
| 2007/0089968 A1 | 4/2007 | Swinderman | |
| 2016/0152417 A1 | 6/2016 | Rolfsson et al. | |

FOREIGN PATENT DOCUMENTS

| | | |
|---|---|---|
| WO | 03053823 A1 | 7/2003 |
| WO | 2015024607 A1 | 2/2015 |
| WO | 2016116940 A1 | 7/2016 |

OTHER PUBLICATIONS

Superior Industries, "Exterra Belt Cleaners", Brochure, Dec. 2015 (4 pages).

Martin Engineering, "Martin Twist Tensioner Operator's Manual", 2015 (28 pages).

Argonics Inc.: Polyurethane Products, (http://www.conveyorcare.com/argonics.html), retrieved Nov. 23, 2016, (2 pages).

ASGCO Manufacturing Inc., "Super Skalper IV", Brochure, Jun. 2012 (2 pages).

Brelko Conveyor Products, "Installation, Operating & Maintenance Manual—E901 Head Pulley Belt Scraper", Version 6.4 Jul. 2015 (18 pages).

Brelko Conveyor Products, "Installation, Operating & Maintenance Manual—E101 Primary Belt Scraper", Version 6.4 Jul. 2015 (22 pages).

Flexco, "Belt Cleaner Component Comparisons", Brochure, 2007 (6 pages).

Flexco, "EZP1T, Standard-Duty Precleaner", Brochure, 2015 (2 pages).

Flexco, "MHCP, Heavy-Duty Cartridge Precleaner", Brochure, 2015 (2 pages).

\* cited by examiner

CONVEYOR BELT CLEANER

BACKGROUND

Belt conveyors are used in bulk material handling (e.g., aggregate and mining) industries to transport bulk material (e.g., sand, gravel, concrete, etc.). In some operational environments, a portion of the bulk material may adhere to the conveyor belt due to moisture or other factors. Some belt conveyors include a scraper blade pivotally mounted near one end of the conveyor. In many implementations, the scraper blade is biased toward the conveyor belt to clean (e.g., remove, scrape) material from the belt such that the scraper blade remains in contact with the conveyor belt as the scraper blade wears due to interaction with the bulk material and/or with the belt.

Adjustment of the biasing mechanism used to retain the scraper blade in contact with the conveyor belt can be time-consuming. Changes in the orientation of the scraper blade relative to the belt and/or the force or pressure with which the scraper blade contacts the scraper blade can result in the need for additional biasing mechanism adjustment and may additionally cause inconsistent performance by or complete failure of the scraper blade.

There is a need for an improved conveyor belt cleaner having improved biasing mechanism and/or improved consistency of contact (e.g., force, pressure, cleaning angle) between the conveyor belt cleaner and the conveyor belt.

DESCRIPTION

Figure 1:
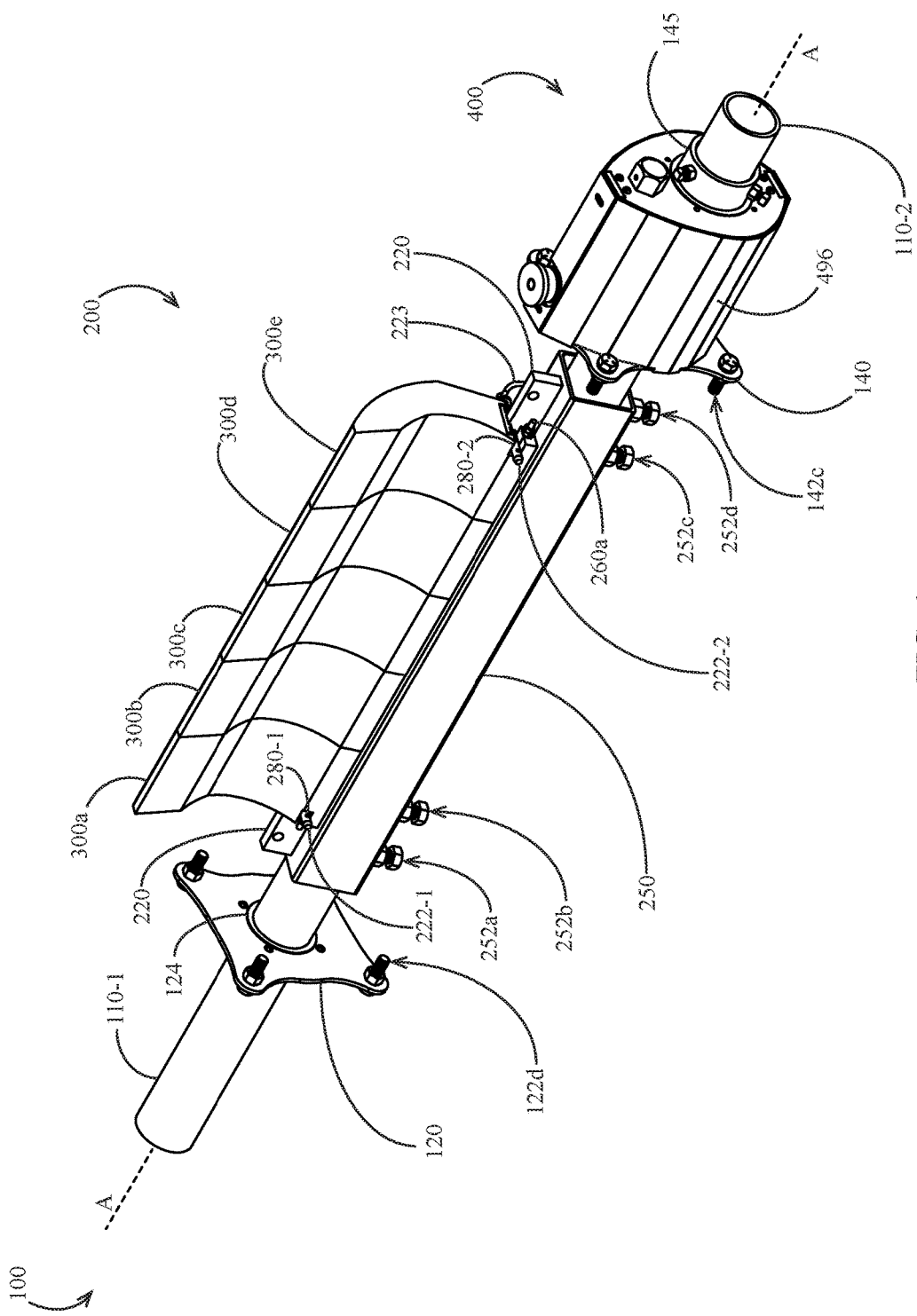
FIG. 1 is a perspective view of an embodiment of a conveyor belt cleaner.

Referring to the drawings, wherein like reference numerals designate identical or corresponding parts throughout the several views, FIGS. 1-4 illustrate an embodiment of a conveyor belt cleaner 100.

The conveyor belt cleaner 100 preferably includes a scraper blade 200. The scraper blade 200 preferably pivots about a pivot axis A. The pivot axis A preferably extends generally transversely to a travel direction T along which material is transferred by the belt conveyor 10. The scraper blade 200 is preferably in contact with an external surface of a belt 12 of the conveyor 10. A belt portion 12a preferably approaches a head pulley 14 of the conveyor along direction T. The scraper blade 200 is preferably in contact with a belt portion 12b which rounds the head pulley 14. A belt portion 12c preferably travels away from the head pulley 14 opposite the direction T (e.g., toward a tail pulley of the conveyor). In some embodiments, the scraper blade 200 contacts the belt portion 12c.

The conveyor belt cleaner 100 is preferably mounted adjacent to the head pulley 14. In some embodiments the belt cleaner 100 is supported by support arms 20 of the belt conveyor 10, which are preferably disposed laterally on either side of the belt 12. The conveyor belt cleaner 100 is preferably supported by mounting plates 120, 140, which are preferably mounted (e.g., removably mounted) to the support arms 200-2, 200-1, respectively. The mounting plates 120, 140 are preferably mounted to the respective support arms 20 by one or more removable fasteners 122, 142, respectively (e.g., nut-and-bolt assemblies).

The scraper blade 200 is preferably mounted to a pivot 110. The pivot 110 preferably pivots about the axis A. The pivot 110 preferably extends through and is pivotally supported in the mounting plates 120, 140, respectively. The pivot 110 preferably extends through bushings 124, 412 supported in the mounting plates 120, 140, respectively. The various bushings described herein may in various embodiments be made of a plastic (e.g., a thermoplastic such as ultra-high-molecular-weight polyethylene or other polyethylene), metal (e.g., brass), or other suitable material. The pivot 110 may comprise a single shaft including shaft portions 110-1, 110-2 extending to either side of the scraper blade, or may comprise two separate and preferably coaxial shaft portions 110-1, 110-2 as illustrated. The pivot 110 preferably comprises one or more hollow tubes (e.g., of circular cross-section as illustrated or of rectangular, square or other cross-section); in some embodiments the pivot 110 comprises a solid or partially hollow shaft.

A blade support member 250 (e.g., a transversely extending member such as a length of square tubing as illustrated) is preferably mounted to the pivot 110 (e.g., to inboard portions of the shaft portions 110-1, 110-2) such that the blade support member pivots with the pivot 110 about the pivot axis A. The blade support member 250 is preferably removably mounted to the pivot 110 (e.g., by fasteners 252 such as nut-and-bolt assemblies extending through openings in the blade support member 250 and contacting and/or extending into the pivot 110). In the illustrated embodiment, fasteners 252a, 252b removably mount the shaft portion 110-1 to a first portion of the blade support member 250 and fasteners 252c, 252d removably mount the shaft portion 110-2 to a second portion of the blade support member; the first and second portions preferably extend through openings positioned adjacent to opposing ends (e.g., left and right transverse ends) of the blade support member 250. The scraper blade 200 is preferably supported by the pivot 110. In the illustrated embodiment, the scraper blade is rigidly mounted (e.g., removably mounted) to the blade support member 250 such that the scraper blade 200 pivots with the blade support member 250 and the pivot 110 about the axis A. In some embodiments, the scraper blade 200 is mounted directly to the pivot 110.

In the illustrated embodiment, the scraper blade 200 is preferably slidingly supported on a rail 220. The rail 220 preferably extends generally parallel to the pivot axis A along an upper surface of the blade support member 250. The scraper blade 200 is preferably selectively locked in position relative to the pivot 110 by one or more fasteners 222. In the illustrated embodiment, the fasteners 222 comprise pins (e.g., hitch pins) which may have one or more clips 223 or other structure preferably adjustable and/or removable for selectively locking the fastener in place. In the illustrated embodiment, fasteners 222-1, 222-2 are inserted through openings 280-1, 280-2, respectively in order to selectively retain the scraper blade 200 in position. The openings 280-1, 280-2 may comprise notches (as illustrated) or holes formed in the scraper blade 200 (or in some embodiments in structure rigidly mounted to the scraper blade 200). The openings 280-1, 280-2 are preferably disposed in opposing transverse ends of the scraper blade 200. In the illustrated embodiment, the fasteners 222 preferably extend through openings 226 provided in the rail 220 such that the fasteners 222 retain the scraper blade 200 in position relative to the rail 220.

Although in some embodiments the scraper blade 200 may comprise a single blade structure (e.g., formed from a polymer such as urethane) extending along a transverse width of the belt 12 (e.g., a width of a portion of the belt 12 on which material is transported), in the illustrated embodiment the scraper blade 200 comprises a plurality of blade segments 300 disposed in transverse side-by-side relation along a direction parallel to the pivot axis A. The segments 300 may formed from a polymer such as urethane. The blade segments 300 may be selectively added or removed to form a scraper blade having a selected overall width. For example, the illustrated embodiment includes five blade segments 300a, 300b, 300c, 300d, 300e each having a width Ws (e.g., between approximately 2 and approximately 10 inches, between 4 and 8 inches, 4 inches, about 4 inches, 5 inches, about 5 inches, 6 inches, about 6 inches, 7 inches, about 7 inches, 8 inches, about 8 inches, between 5 and 8 inches, between 5 and 7 inches) such that the overall width of the scraper blade 200 is 5 Ws. One or more blade segments 300 may be removed in order to reduce the overall width of the scraper blade 200 by increments of Ws (or by other increments in some embodiments in which the width of the blade segments varies). The blade segments 300 are preferably of substantially the same shape with at least the exception of openings 280-1, 280-2 which are preferably provided in the outboard blade segments 300a, 300e, respectively but are preferably not provided in the other blade segments. A plurality of openings 226 (e.g., holes, notches) are preferably provided along the width of rail 220 such that in each of a plurality of scraper blade configurations (e.g., comprising two blade segments, three blade segments, four blade segments, five blade segments) two openings 226 are respectively aligned with openings 280-1, 280-2 such that a fastener 222 may be inserted through each opening 226 and aligned opening 280 in order to retain the scraper blade 200 in position relative to the rail 220.

The blade segments 300 are preferably retained (e.g., compressed) in side-by-side relation by one or more shafts 260; for example, a first shaft 260a may extend through each of the blade segments 300 along an axis rearward of the rail 220 while a second shaft 260b may extend through each of the blade segments 300 along an axis forward of the rail 220. Fasteners 262 are preferably disposed on either end of the scraper blade 200 to retain the relative position of the blade segments 300 along the direction of pivot axis A. In some embodiments the fasteners 262 additionally compress the blade segments together along a direction parallel to pivot axis A.

In the illustrated embodiment, the fasteners 262-1 and 262-2 comprise one or more threaded nuts which may be tightened on to first and second threaded ends, respectively, of each shaft 260 until the fasteners contact and/or compress the blade segments 300. A compressive force applied to the blade segments 300 by left fastener 262-1 is preferably counteracted by right fastener 222-2. A compressive force applied to the blade segments 300 by right fastener 262-2 is preferably counteracted by left fastener 222-1.

In some embodiments, a blade attachment bracket connects (e.g., slidingly connects) the scraper blade 200 to the blade support member 250 and/or to the rail 220. In embodiments in which the scraper blade 200 comprises a plurality of blade segments 300, the blade attachment bracket may comprise a plurality of blade attachment brackets preferably having the same width as the blade segments and connecting each blade segment to the rail 220. In some embodiments, the blade segments 300 may be connected to the rail 220 by a single blade attachment bracket extending along the width of the scraper blade 200.

Figure 2:
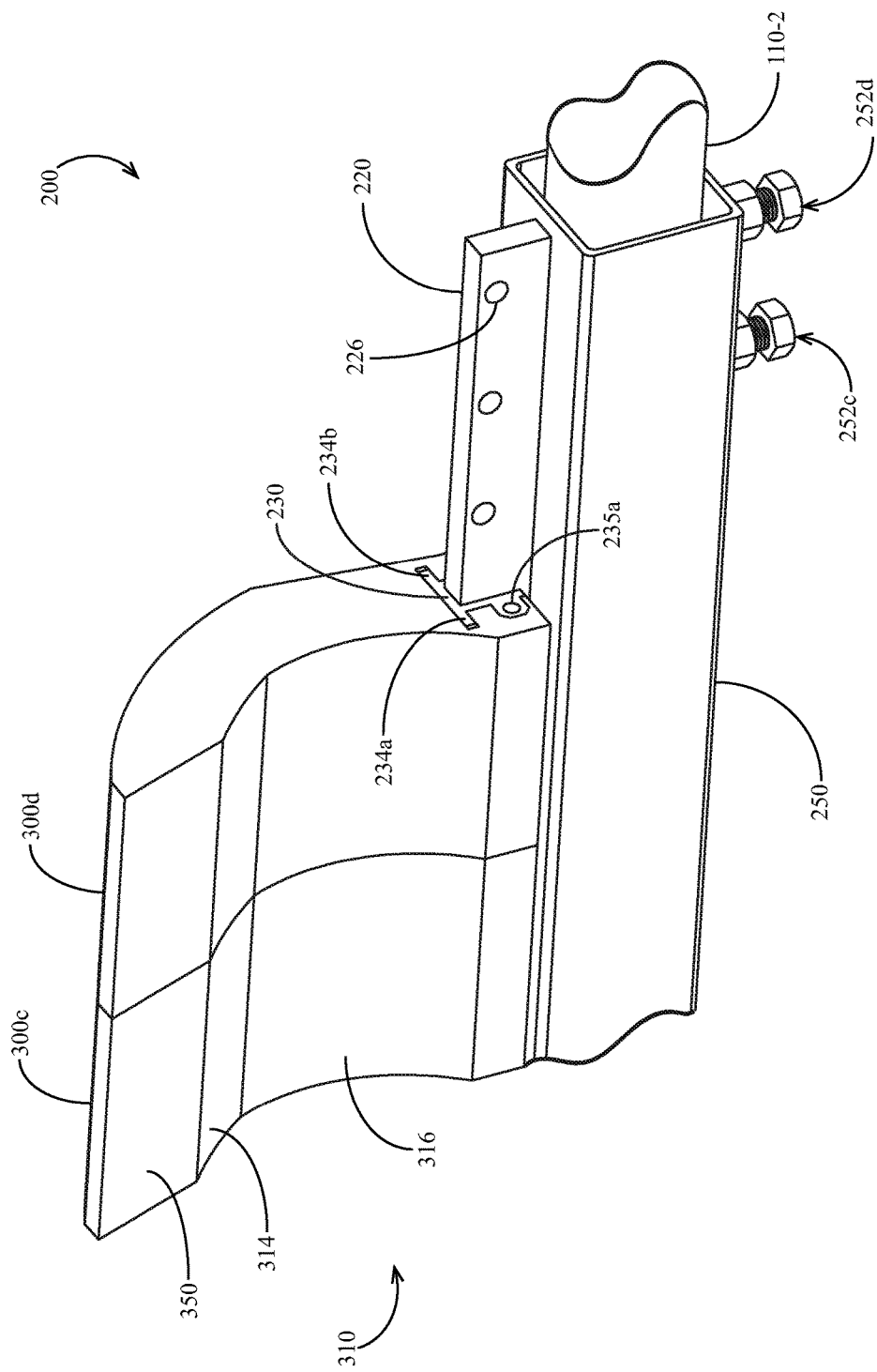
FIG. 2 is an enlarged perspective view of a portion of the conveyor belt cleaner of FIG. 1 with certain components, including a scraper blade segment thereof, removed.
Figure 3:
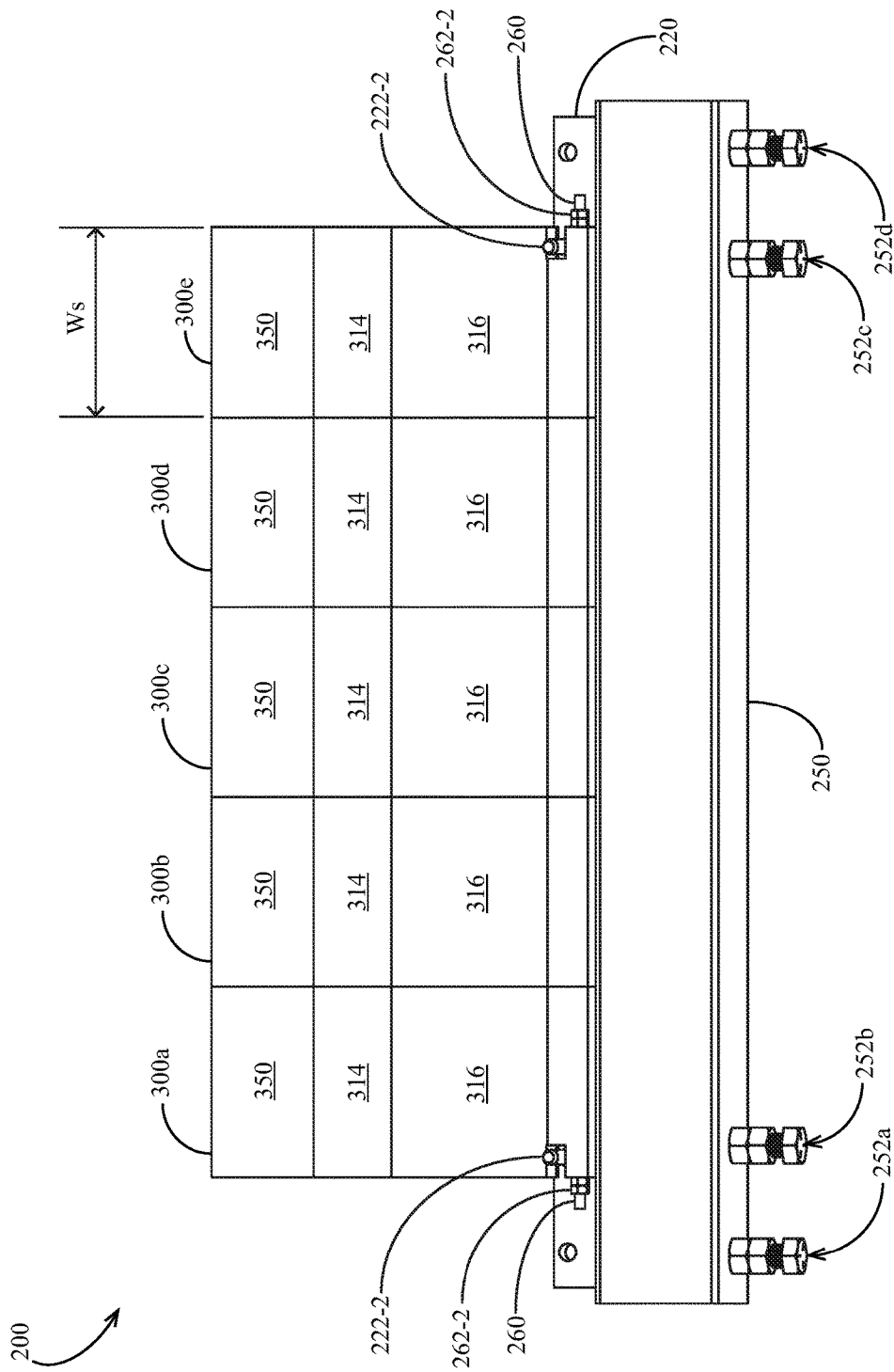
FIG. 3 is a partial rear elevation view of the conveyor belt cleaner of FIG. 1.
Figure 5:
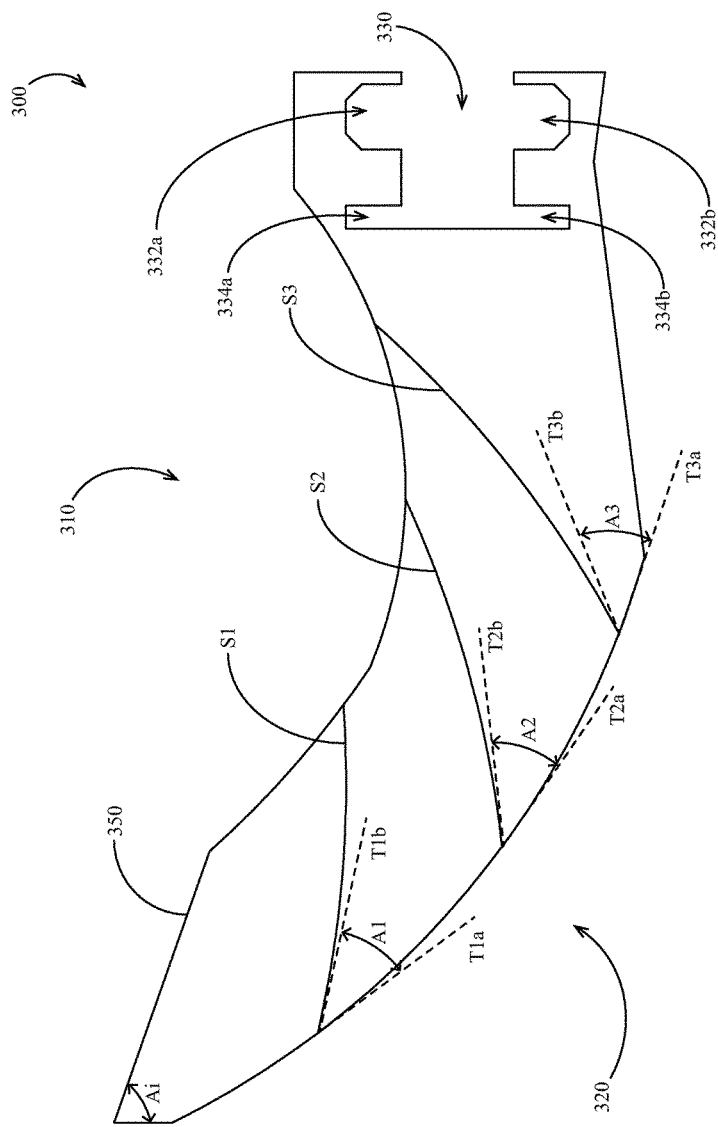
FIG. 5 is a side elevation view of an embodiment of a conveyor scraper blade segment, illustrating belt contact surfaces at a plurality of wear conditions of the scraper blade segment.
Figure 6:
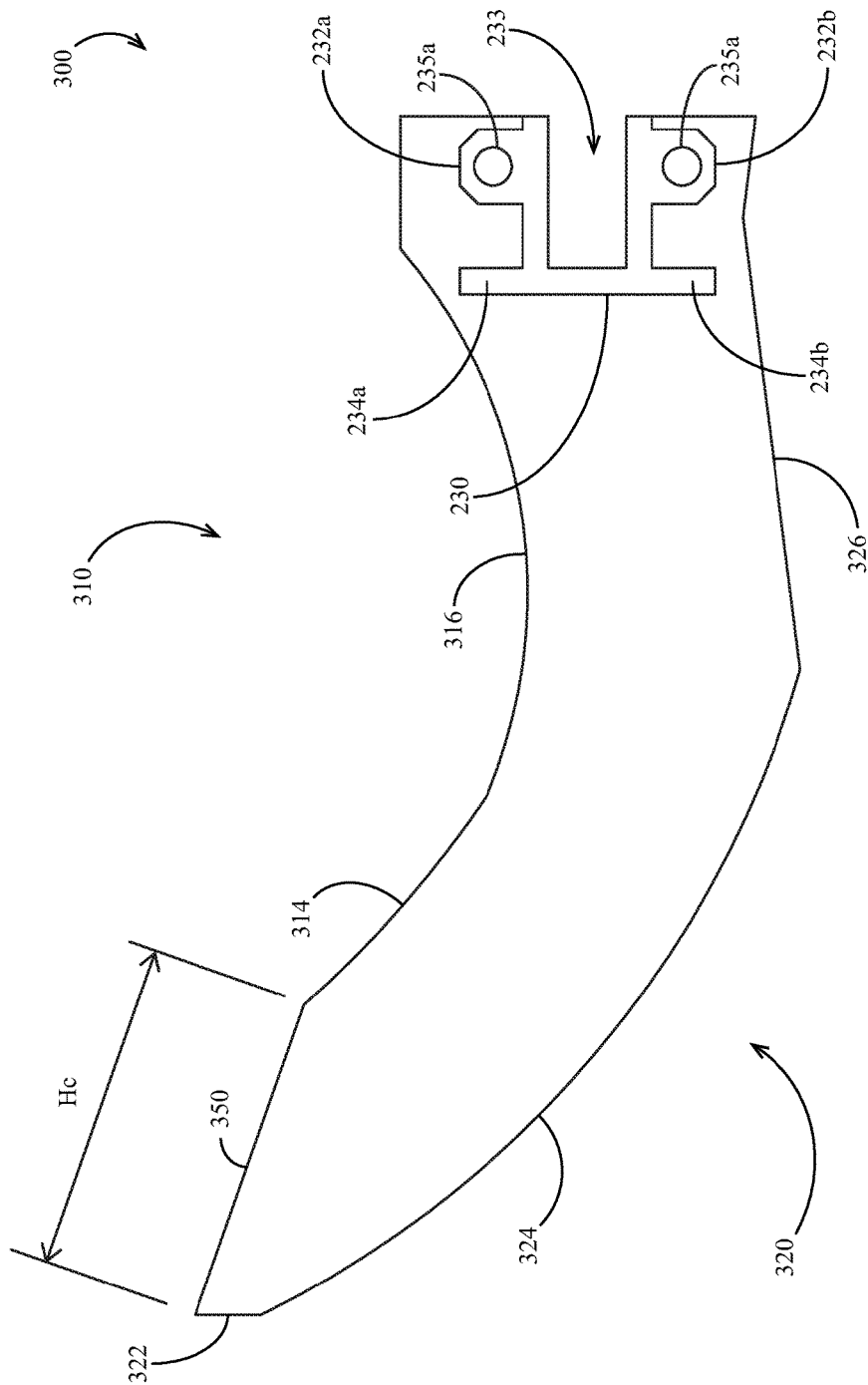
FIG. 6 is a side elevation view of the scraper blade segment of FIG. 5 in conjunction with a blade support member.
Figure 7:
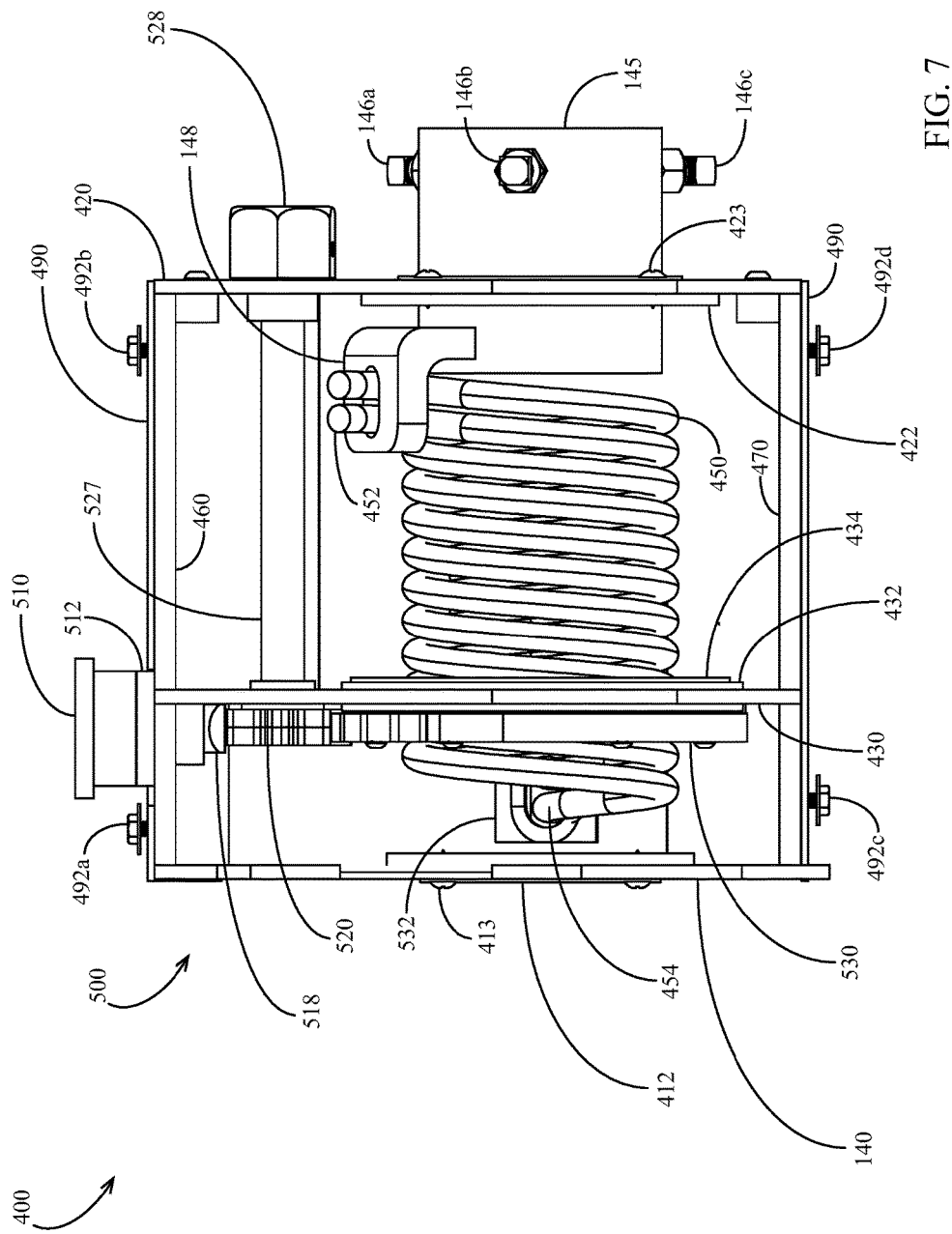
FIG. 7 is a rear elevation view of an embodiment of a tensioning assembly.
Figure 8:
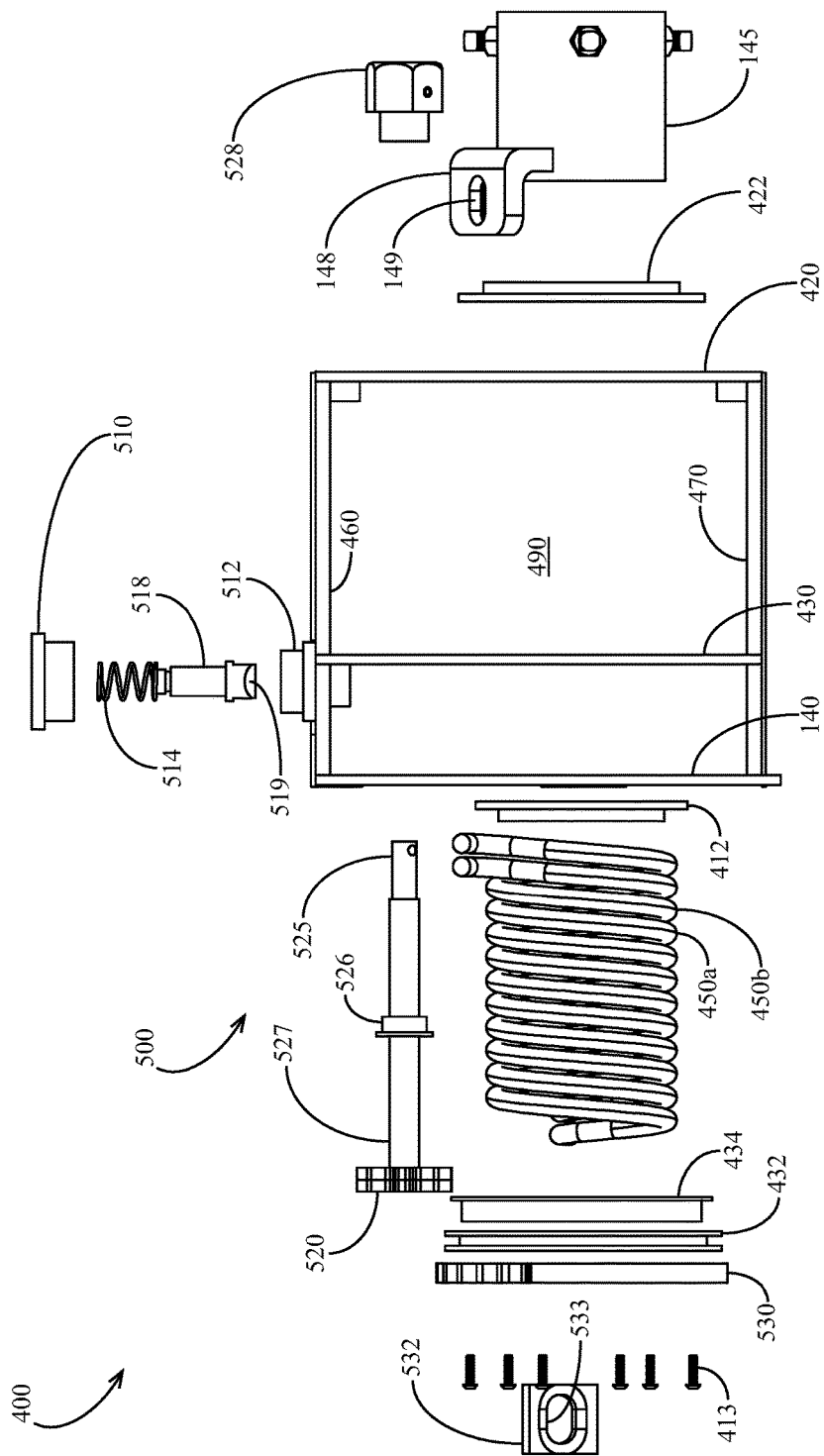
FIG. 8 is an exploded rear elevation view of the tensioning assembly of FIG. 7.
Figure 9:
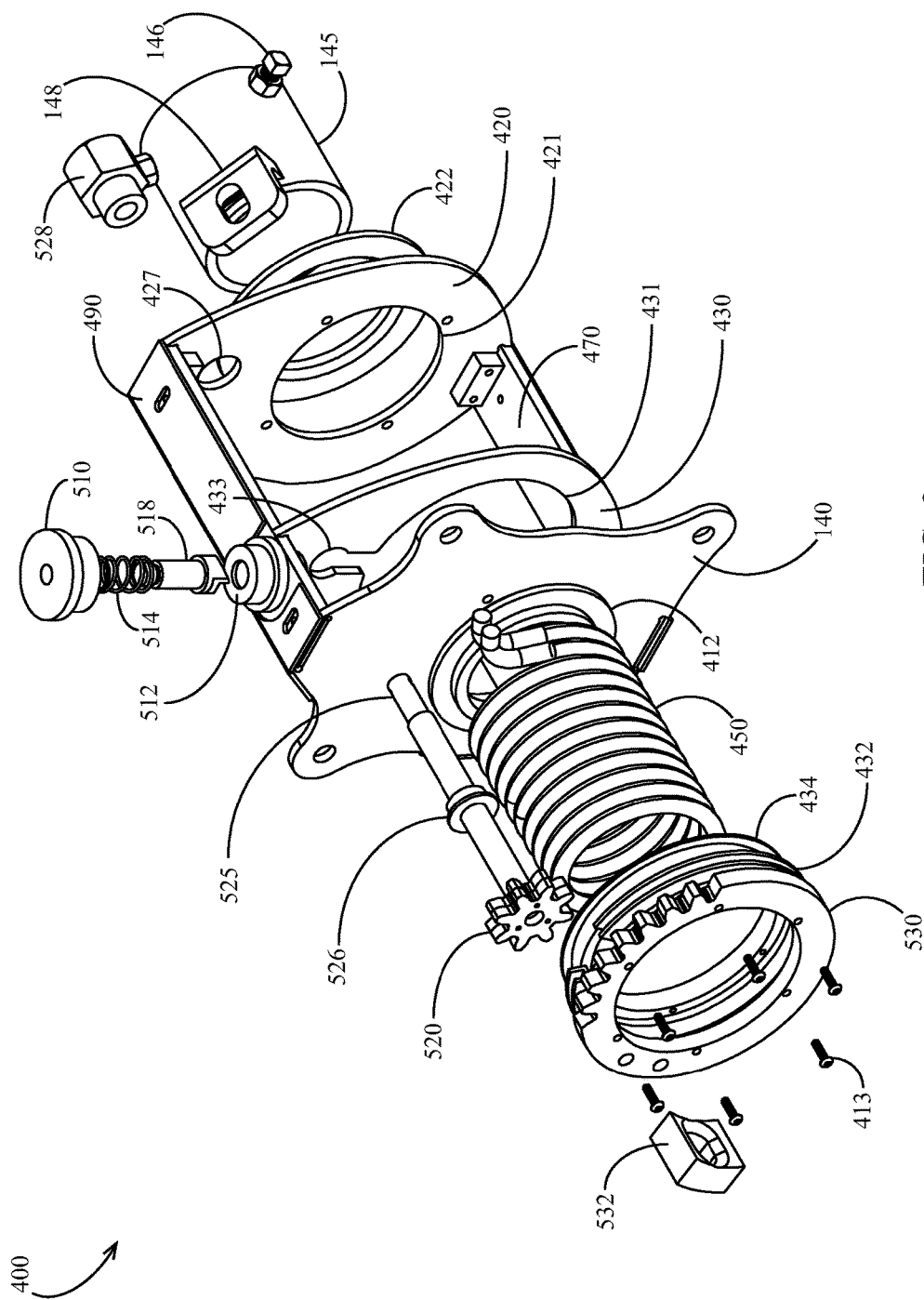
FIG. 9 is an exploded perspective view of the tensioning assembly of FIG. 7.
Figure 10:
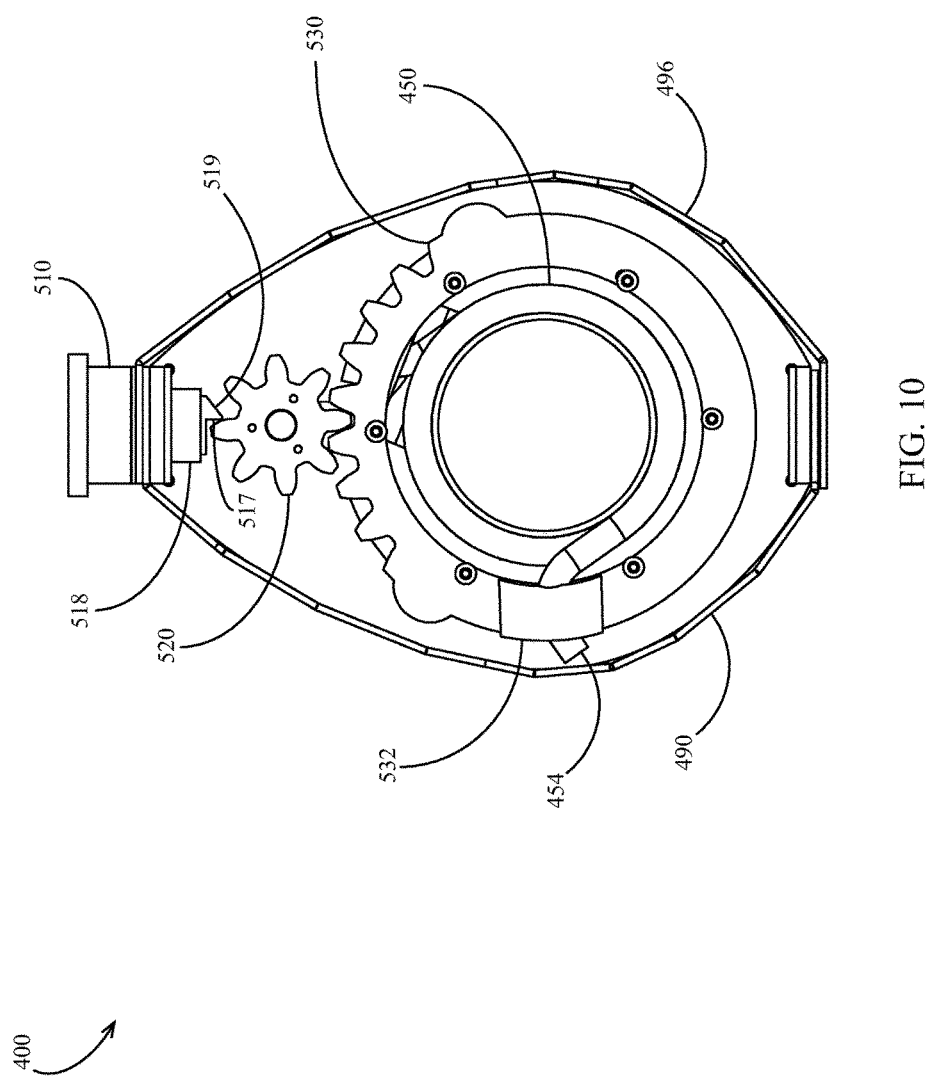
FIG. 10 is a side elevation view of the tensioning assembly of FIG. 7.
Figure 11:
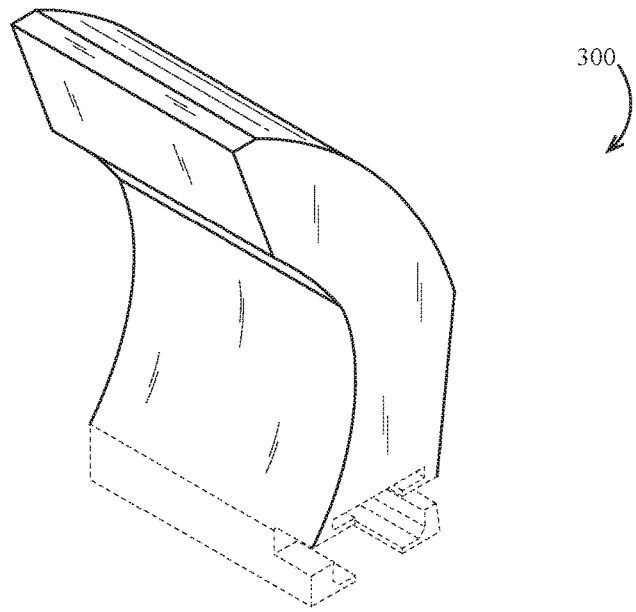
FIG. 11 is a perspective view of an embodiment of a scraper blade segment.
Figure 12:
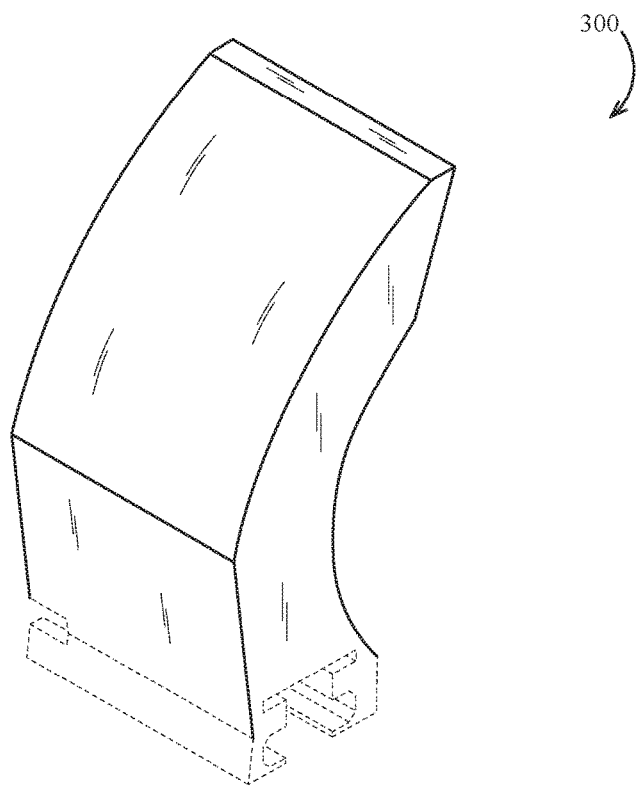
FIG. 12 is another perspective view of the scraper blade segment of FIG. 11.
Figure 13:
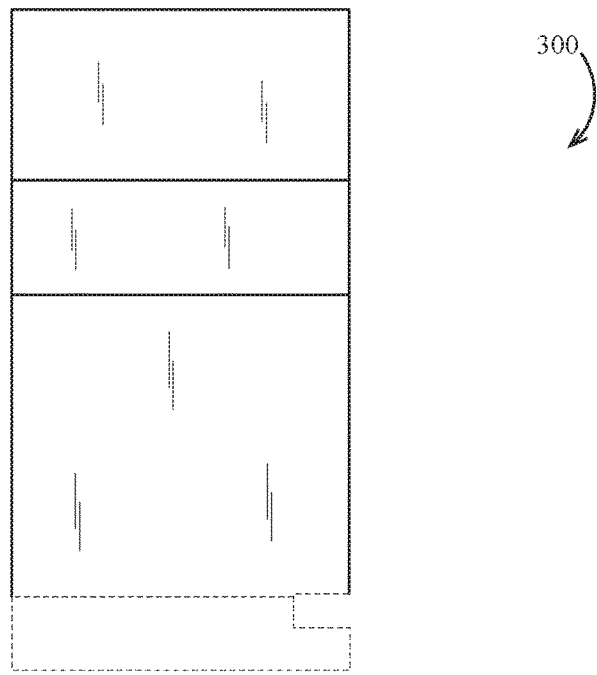
FIG. 13 is a rear elevation view of the scraper blade segment of FIG. 11.
Figure 14:
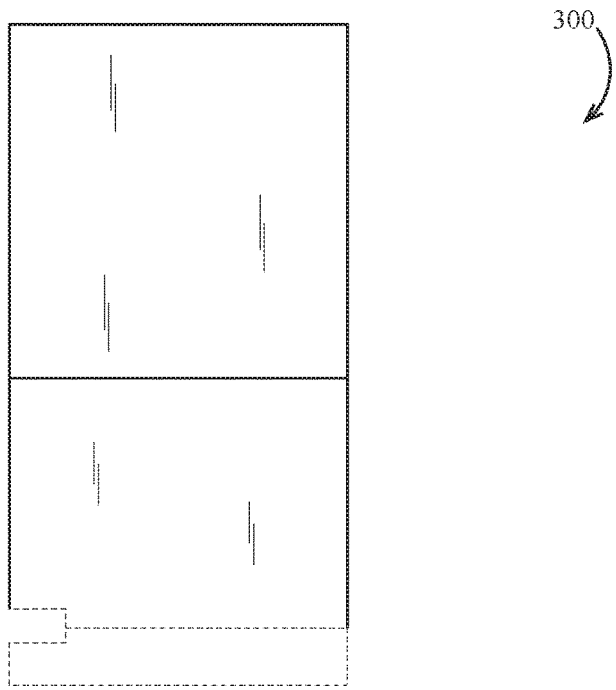
FIG. 14 is a front elevation view of the scraper blade segment of FIG. 11.
Figure 15:
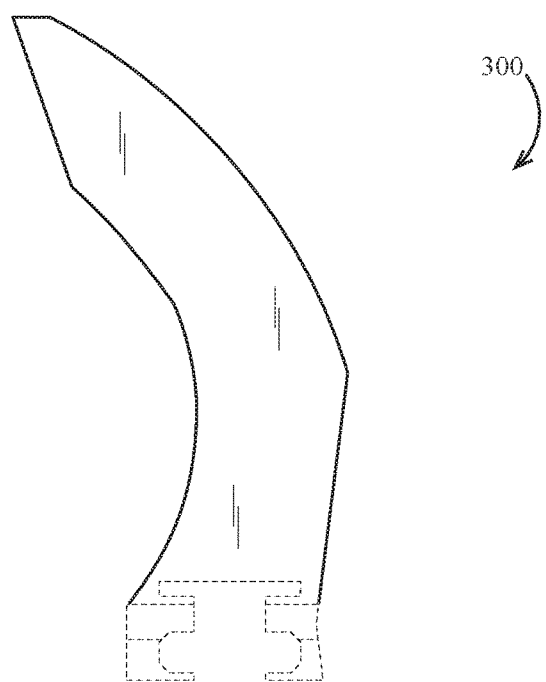
FIG. 15 is a right side elevation view of the scraper blade segment of FIG. 11.
Figure 16:
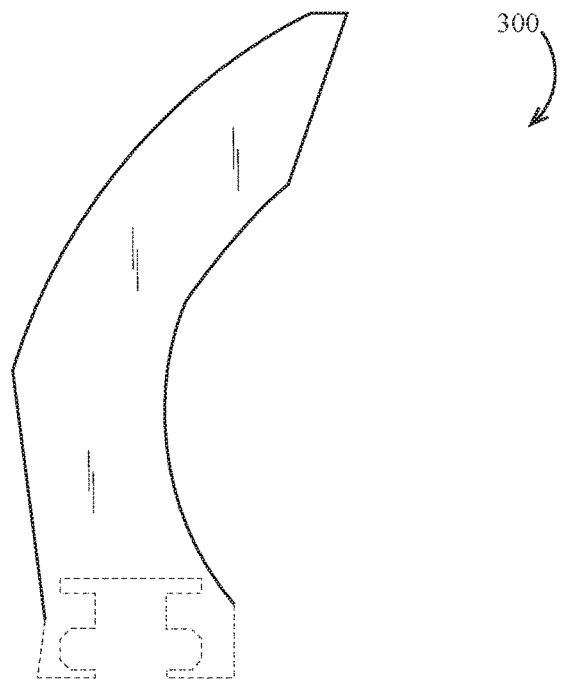
FIG. 16 is a left side elevation view of the scraper blade segment of FIG. 11.
Figure 17:
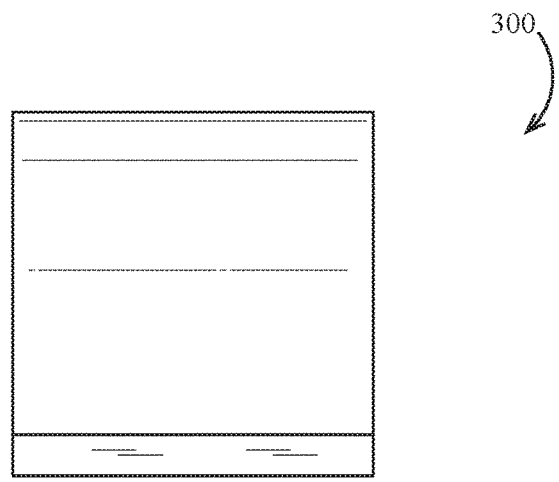
FIG. 17 is a top view of the scraper blade segment of FIG. 11.
Figure 18:
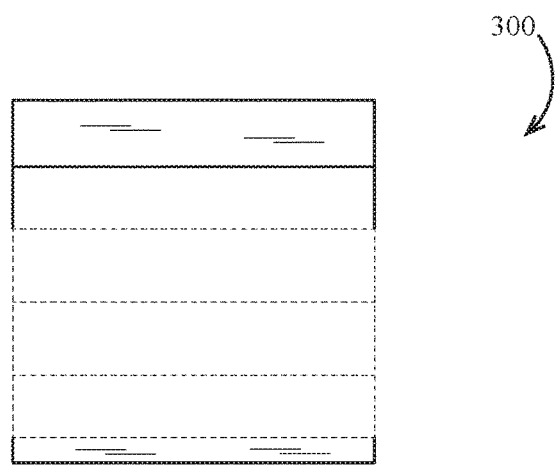
FIG. 18 is a bottom view of the scraper blade segment of FIG. 11.
Figure 19:
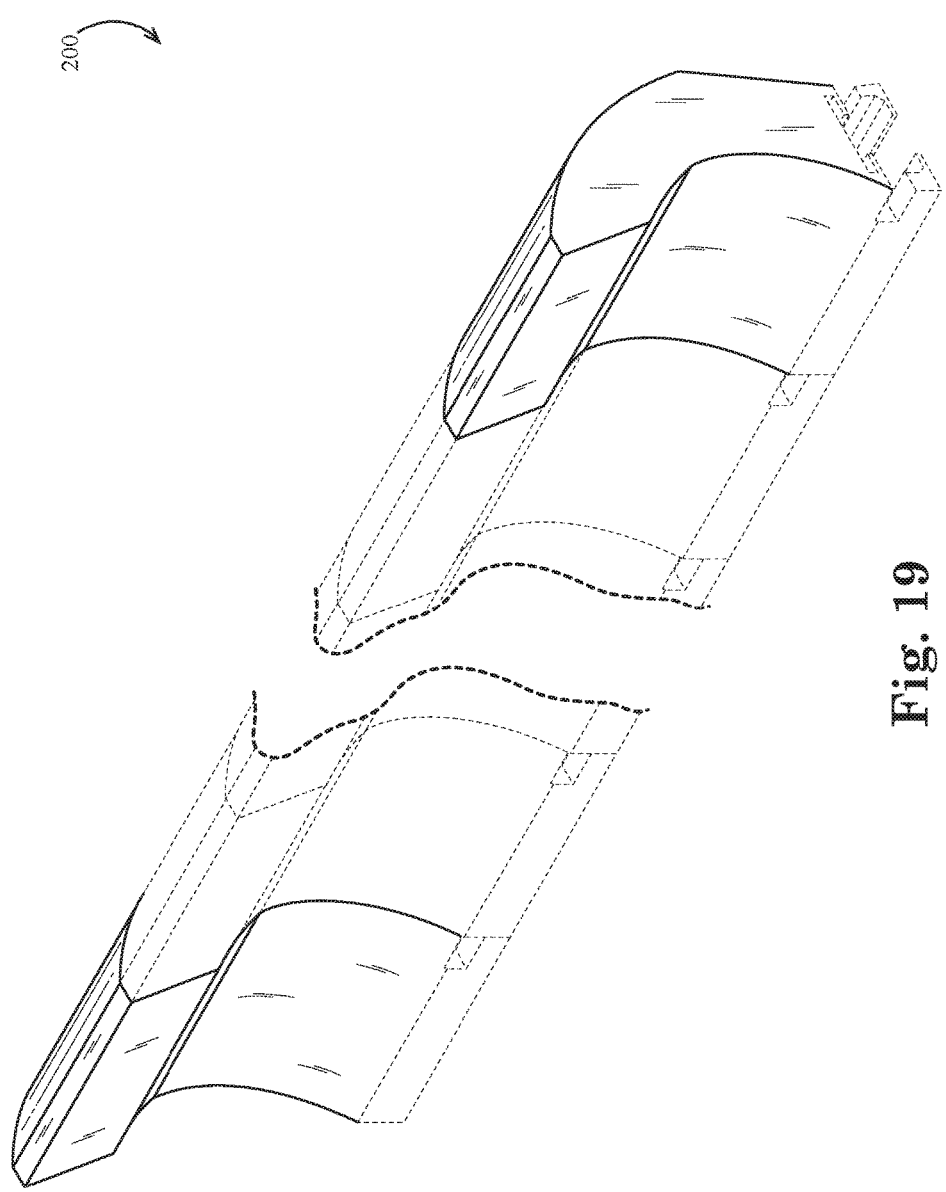
FIG. 19 is a perspective view of an embodiment of a scraper blade.
Figure 20:
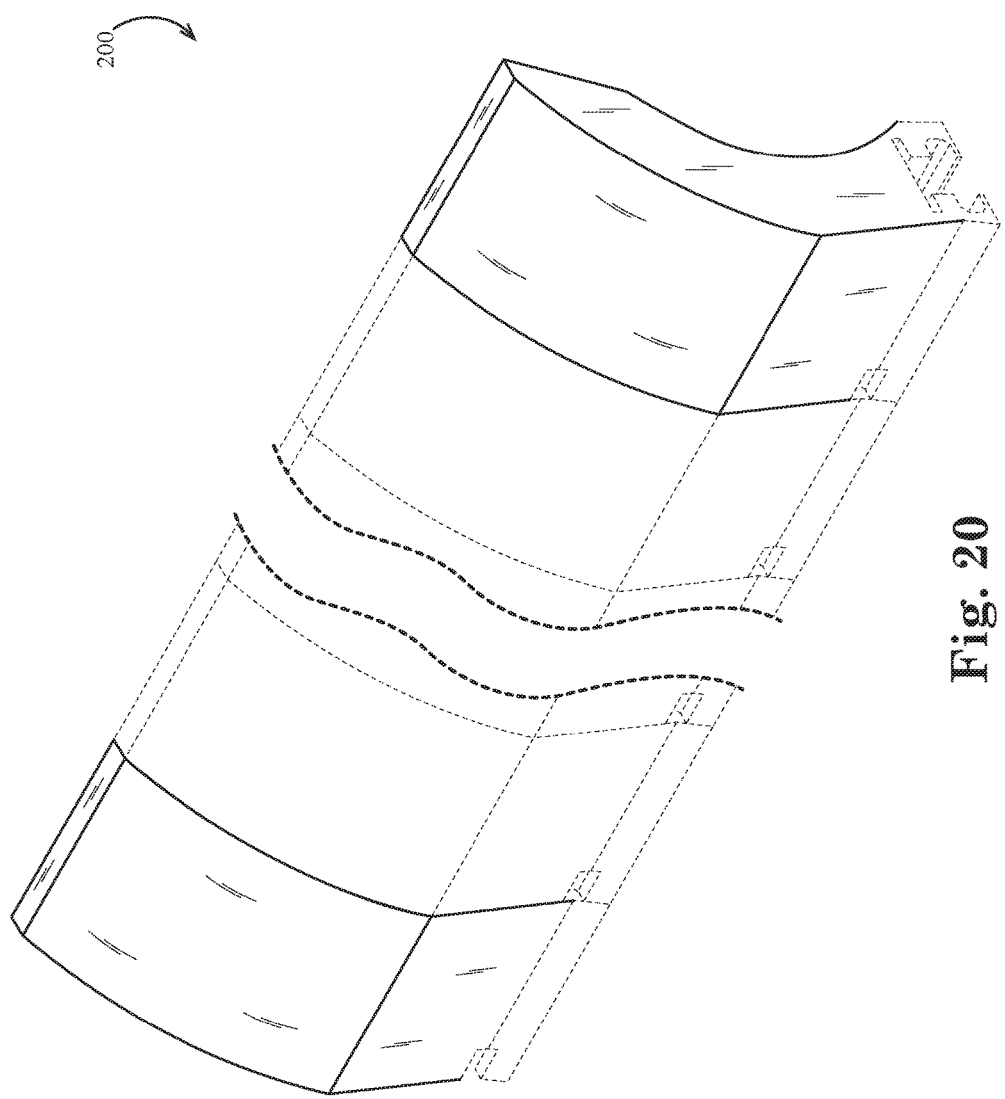
FIG. 20 is another perspective view of the scraper blade of FIG. 19.
Figure 21:
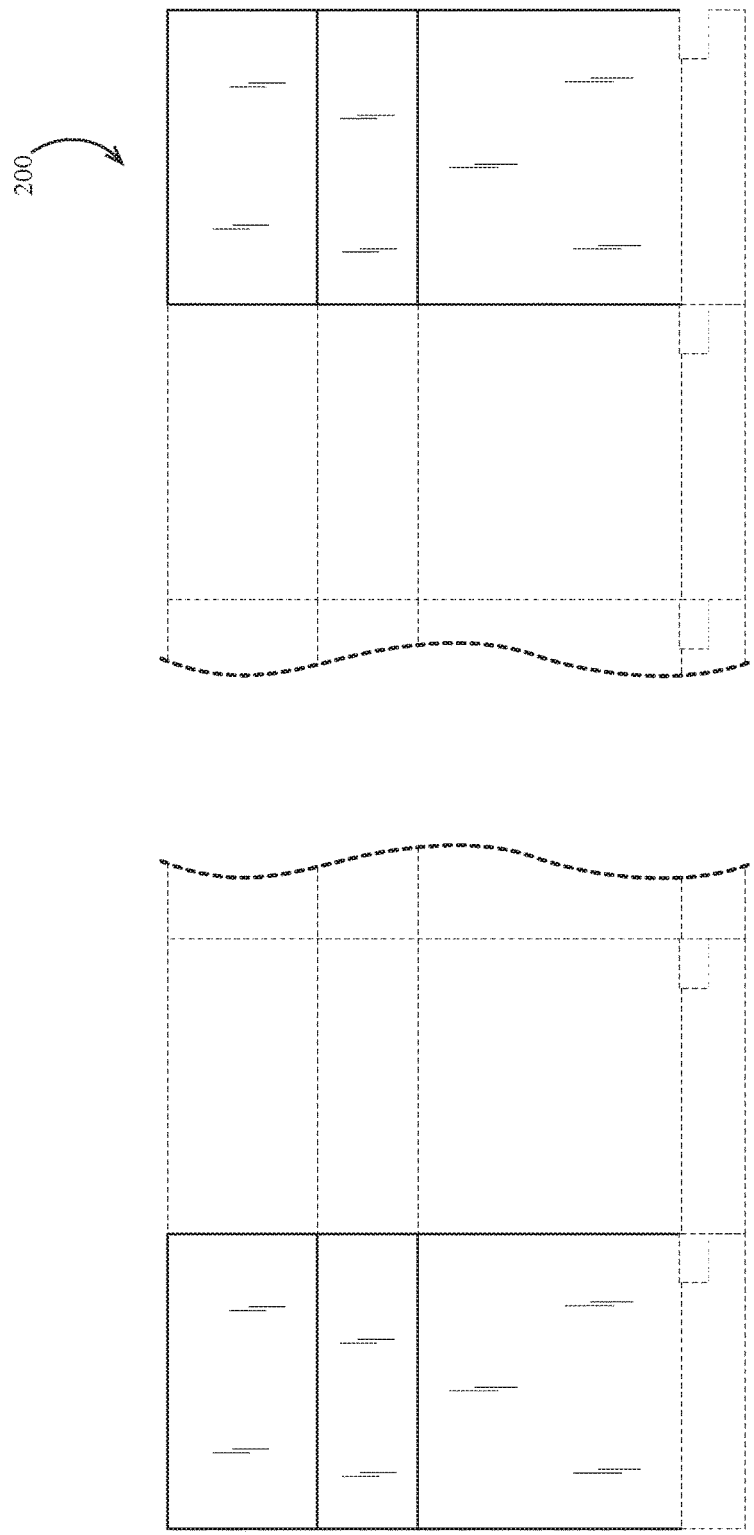
FIG. 21 is a rear elevation view of the scraper blade of FIG. 19.
Figure 22:
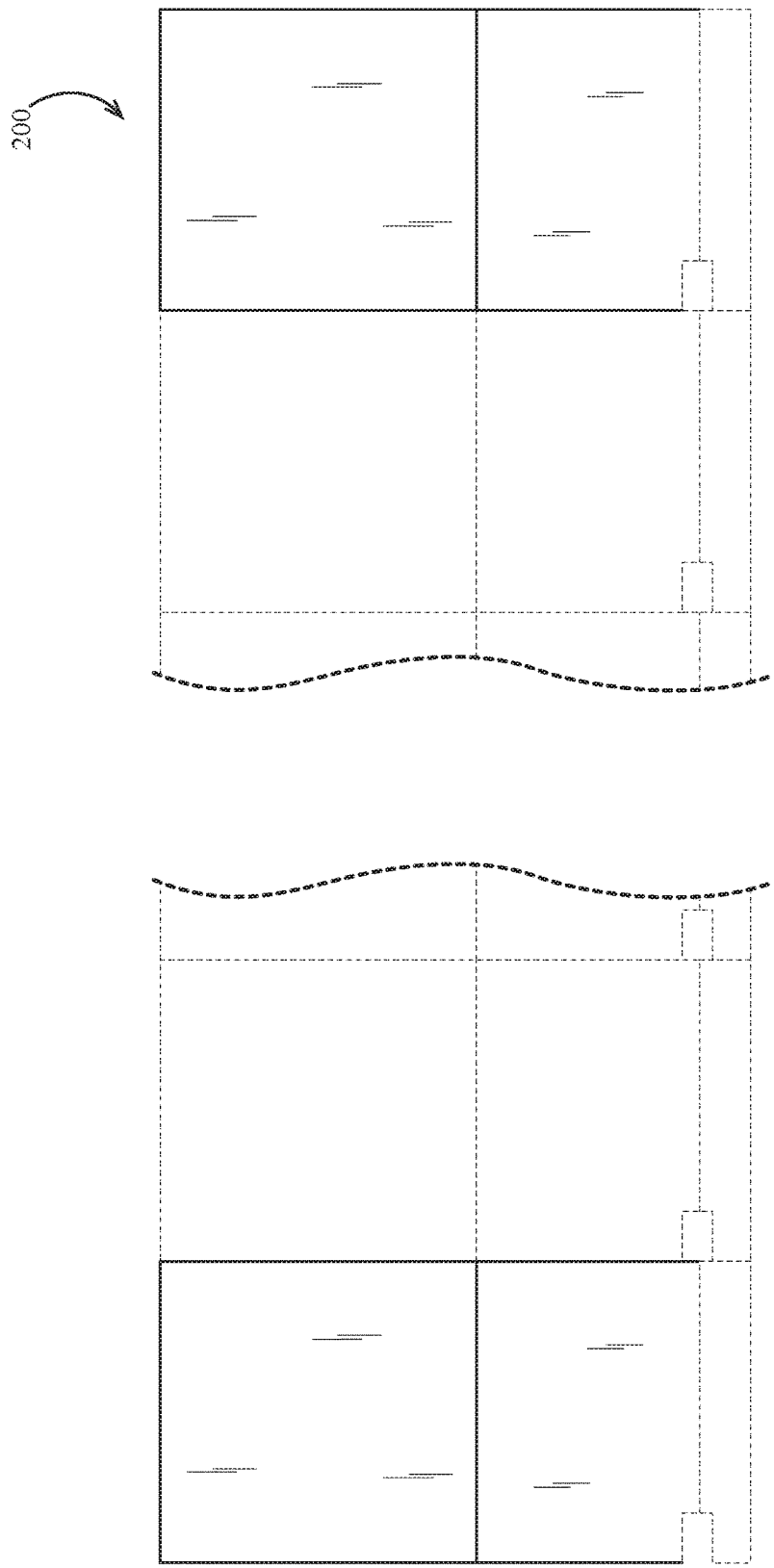
FIG. 22 is a front elevation view of the scraper blade of FIG. 19.
Figure 24:
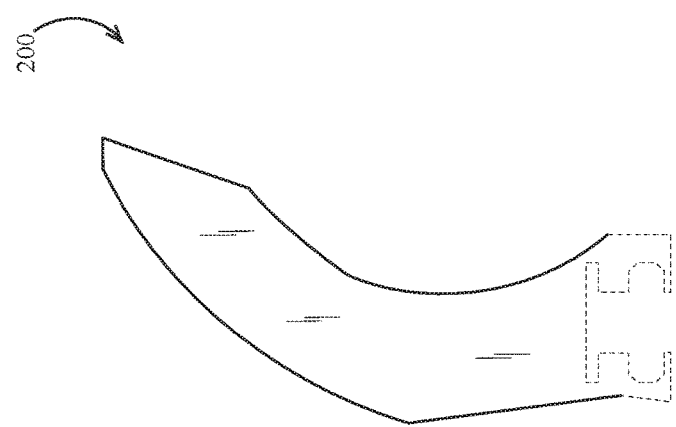
FIG. 24 is a left side elevation view of the scraper blade of FIG. 19.
Figure 23:
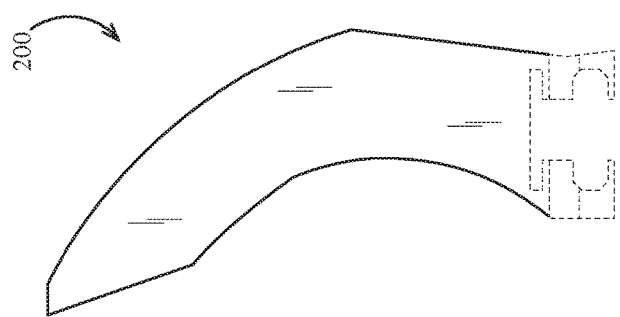
FIG. 23 is a right side elevation view of the scraper blade of FIG. 19.
Figure 25:
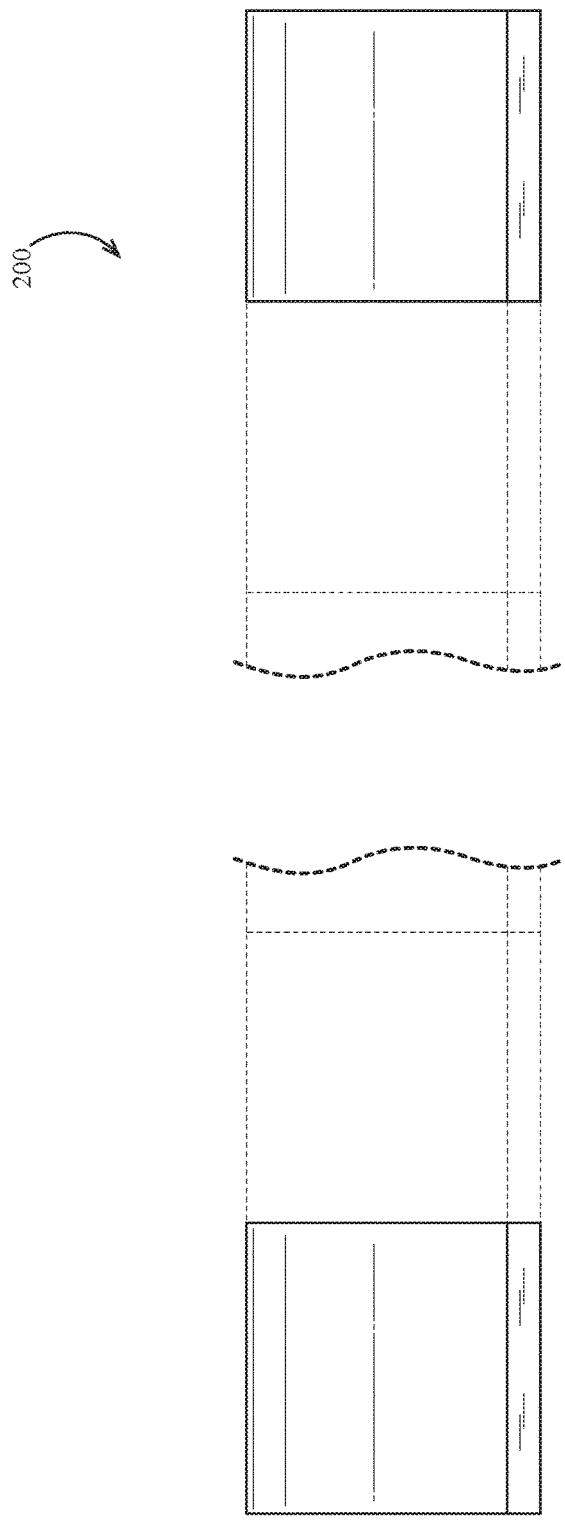
FIG. 25 is a top view of the scraper blade of FIG. 19.
Figure 26:
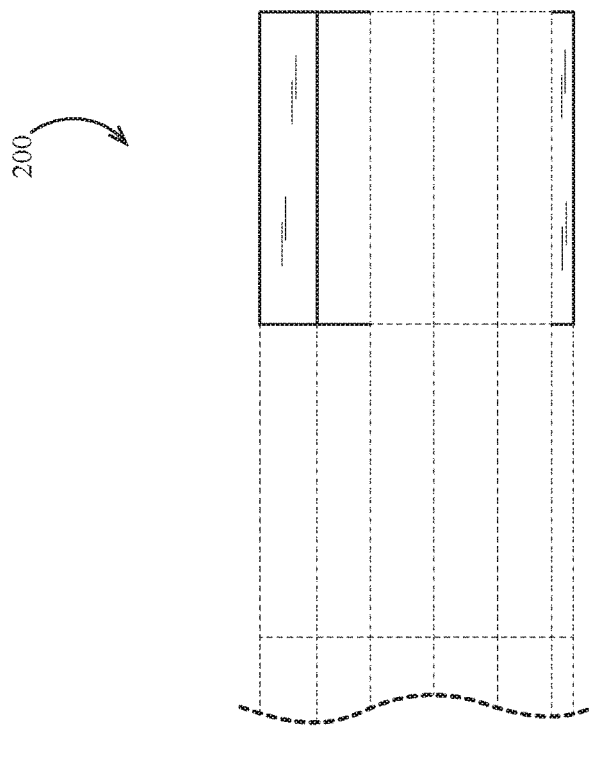
FIG. 26 is a bottom view of the scraper blade of FIG. 19.

Referring to FIGS. 2, 5 and 6, a blade attachment bracket 230 preferably supports each blade segment 300, preferably at a proximal end thereof. The blade attachment bracket 230 may be made of a metal (e.g., steel or aluminum) or in other embodiments may be made of a polymer such as urethane. The blade attachment bracket 230 is preferably received in an opening 330 formed in a proximal end of each blade segment 300. In a preferred embodiment, the blade segment 300 is overmolded on the blade attachment bracket 230. The blade attachment bracket 230 preferably includes a channel 233 configured to engage (e.g., slidingly engage) the rail 220; for example, the channel 233 may have a cross-sectional shape (e.g., rectangular) corresponding to (e.g., configured to mate to) a cross-sectional shape of the rail 220.

The blade attachment bracket 230 preferably includes one or more protrusions 234 received in corresponding channels 334 of the opening 330. In the illustrated embodiment, a first protrusion 234a extends rearwardly into a rearward channel 334a and a second protrusion 234b extends forwardly into a forward channel 334b.

The blade attachment bracket 230 preferably includes one or more shaft receiving portions 232 extending into corresponding channels 332 of the opening 330. Each shaft receiving portion 232 preferably includes an opening 235 sized to receive a shaft 260 (e.g., having a diameter approximately equal to or slightly greater than a diameter of the shaft 260). Upon installation, the shaft 260 preferably extends through the openings 235 of each of the blade attachment brackets 230. In the illustrated embodiment, a first shaft receiving portion 232a extends rearwardly into a rearward channel 332a and a second shaft receiving portion 232b extends forwardly into a forward channel 332b.

Referring to FIGS. 5 and 6, each blade segment 300 (and/or the scraper blade 200, which may in some embodiments comprise a single unitary structure) preferably includes a rearward face 310 (e.g., facing the conveyor belt 12) and a forward face 320 (e.g., facing away from the conveyor belt 12). A contact surface 350 preferably extends between the rearward face 310 and the forward face 320. The contact surface 350 preferably contacts the conveyor belt 12 in operation (see FIG. 4); in some embodiments, only an edge (e.g., distal edge) of the forward face 320 contacts the conveyor belt 12 in operation. The contact surface 350 may in various embodiments have a height Hc of less than 6 inches, between 1 and 5 inches, between 2 and 4 inches, about 2 inches, about 3 inches, about 4 inches, between 2.5 and 4 inches, between 2.5 and 3.5 inches, 3.1 inches, about 3.1 inches, 3.2 inches, about 3.2 inches, 3.3 inches, about 3.3 inches, between 3 and 3.5 inches, between 3.1 and 3.4 inches, and between 3 and 3.25 inches.

Referring to FIG. 5, as the scraper blade 200 contacts the conveyor belt 12 and/or aggregate material during operation, the scraper blade will tend to wear. In the illustrated embodiment, the blade segment 300 may wear in operation such that subsequent contact surfaces S1, S2 and S3 successively contact the surface 12 during a portion of the wear life of the blade segment 300. A substantial portion (e.g., greater than 5%, greater than 10%, etc.) of the volume of the scraper blade 200 is preferably removed by wear between each surface 350, S1, S2 and S3. The surfaces 350, S1, S2, S3 are preferably separated by a distance that is a substantial percentage (e.g., greater than 5%, greater than 10%, etc.) of an overall height of the scraper blade 200 (e.g., measured along a distance normal to the pivot axis A). Tangential planes T1b, T2b, T3b are preferably tangential to the contact surfaces S1, S2, S3, respectively at distal (e.g., upper) edges thereof. At the distal edge of the scraper blade 200, tangential planes T1a, T2a, T3a are preferably tangential to the forward face 320 at the distal (e.g., upper) edges thereof. Cleaning angles A1, A2, A3 may be defined as acute angles between the tangential planes T1a and T1b; T2a and T2b; and T3a and T3b, respectively. The cleaning angles A1, A2, A3 are preferably substantially the same and/or within an effective operational range. The effective operational range preferably encompasses a set of cleaning angles having substantially equivalent effectiveness for cleaning the conveyor belt (e.g., between 90% and 105% of A1, between 95% and 110% of A1, between about 90% and about 110% of A1, between 95% and 105% of A1, between 98% and 102% of A1, between 98% and 110% of A1, between 90% and 102% of A1, between 30 and 45 degrees, between 30 and 40 degrees, between 35 and 45 degrees, between 35 and 50 degrees, between 40 and 45 degrees, between 40 and 50 degrees, between 30 and 35 degrees, between 35 and 40 degrees, between 33 and 48 degrees, between 38 and 43 degrees).

An initial cleaning angle Ai may be defined as an acute angle between the initial contact surface 350 and the forward face 320. In some embodiments, the initial cleaning angle Ai is substantially the same as the angles A1, A2, and/or A3, and/or is within the effective operational range. In other embodiments (e.g., in embodiments having a distal discontinuous surface 322 described herein), the initial cleaning angle Ai is substantially different from the angles A1, A2, and/or A3 and/or is outside of (e.g., greater than) the effective operational range.

In some embodiments, an arc length (e.g., as measured from the rearward surface 310 to the forward face 320) of the surface 1 is greater than an arc length of the surface S2, an arc length of surface S2 than is greater than an arc length of surface S3, and/or an arc length of surface S1 is greater than an arc length of surface S3.

Figure 4:
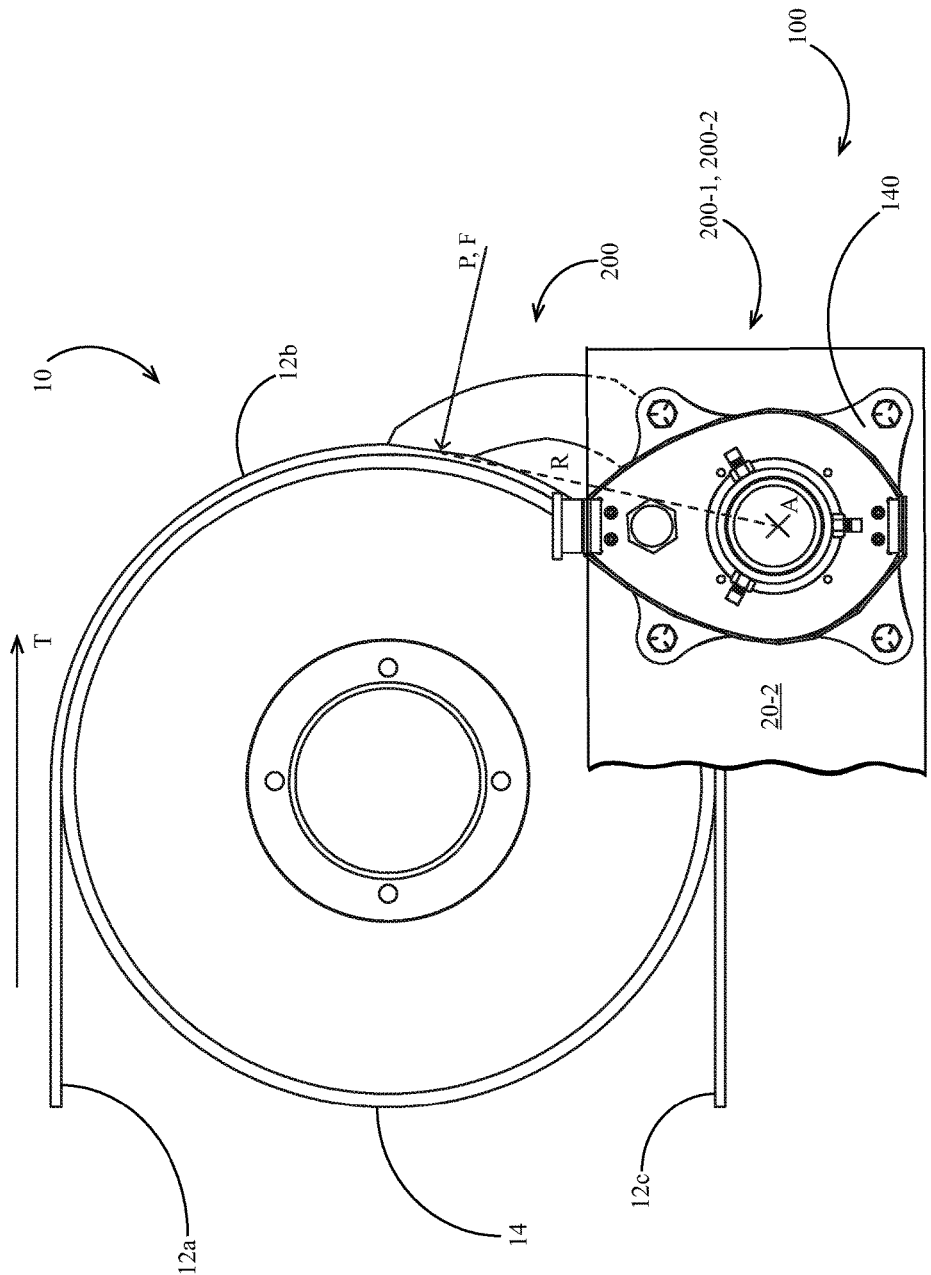
FIG. 4 is a side elevation view of the conveyor belt cleaner of FIG. 1 in conjunction with a belt conveyor.

Referring to FIG. 4, a pressure P applied to the conveyor belt 12 may be directly related to one or more of the following variables: a moment M applied to the scraper blade 200 about the pivot axis A; and/or an average radius R at which a net force F is applied to the conveyor belt 12 along the contact surface. The moment M may decrease as the scraper blade wears and pivots toward the conveyor belt 12; for example, a tensioner assembly spring may expand such that the applied moment M decreases. The radius R may vary as the scraper blade wears due to the varying orientation, shape, and/or position of contact surfaces 350, S1, S2, S3.

The pressure P may be inversely related to one or more of the following variables: an acute force angle Af between the net force F and vector normal to the conveyor belt surface at the radius R; and/or a surface area As of the contact surfaces 350, S1, S2, S3.

The pressure P is preferably substantially constant and/or remains within an operationally effective pressure range (e.g., between 90% and 105% of an average pressure Pa, between 95% and 110% of Pa, between 90% and 110% of Pa, between 95% and 105% of Pa, between 98% and 102% of Pa, between 98% and 110% of Pa, between 90% and 102% of Pa, as the surface blade wears between one or more contact surfaces (e.g., contact surfaces 350 to S1, S1 to S2, S2 to S3). The average pressure Pa may be determined as the average of all pressures exerted as the scraper blade wears from one contact surface to another. The operationally effective pressure range preferably includes pressures at which substantially all of the aggregate material is removed from the surface of conveyor belt 12.

In some embodiments, the pressure P remains substantially constant and/or within the operationally effective pressure range due to counteracting changes in the variables inversely and directly related to the pressure P, which may result at least in part from the varying orientation, shape, and/or position of contact surfaces 350, S1, S2, S3.

Referring to FIG. 6, the contact surface 350 is preferably substantially planar; in other embodiments, the contact surface 350 may be concave. A distal surface 314 of the rearward face 310 preferably has an average radius of curvature R-314. A proximal surface 316 of the rearward face 310 preferably has a second radius of curvature R-316. The radius of curvature R-314 is preferably greater than (e.g., more than twice, more than 150% of, more than 125% of, more than 110% of, etc.) the radius of curvature R-316. A surface 324 of the forward face 320 preferably has a radius of curvature R-324. The radius of curvature R-324 is preferably less than the radius of curvature R-314. The surface 324 preferably has a generally continuous slope. In some embodiments, a discontinuous surface 322 (e.g., a substantially planar surface) extends from a distal edge of the surface 324 to the contact surface 350. The slope of the discontinuous surface 322 at a first point adjacent to the distal edge of surface 324 is preferably discontinuous from a slope of the surface 324 at a second point adjacent to the distal edge of the surface 324. A surface 326 preferably extends from a proximal edge of the surface 324 along a plane intersecting the rail 220 (e.g., an upper surface thereof).

In various embodiments, a minimum thickness of the scraper blade 200 (e.g., a minimum distance between rearward surface 310 and forward face 320) is greater than 2 inches, greater than 2.25 inches, greater than 2.5 inches, greater than 2.75 inches, between 2 inches and 4 inches, between 2.5 and 4 inches, between 3 and 4 inches, between 2 and 2.5 inches, between 2 and 2.75 inches, between 2.25 and 3 inches, between 2 and 2.4 inches, between 2.1 and 2.4 inches, between 2.5 and 3.5 inches, between 2.75 and 3 inches, and between 2.75 and 3.25 inches. In various embodiments, a ratio between the height Hc of the contact surface 350 and the minimum thickness of the scraper blade 200 is between 1 and 2, between 1.1 and 1.9, between 1.2 and 1.8, between 1 and 1.5, between 1.2 and 1.6, between 1.3 and 1.5, between 1.2 and 1.4, 1.2, about 1.2, 1.3, about 1.3, 1.4, about 1.4, 1.5, and about 1.5.

In various some embodiments, the scraper blade and/or supporting structure may be similar to those embodiments disclosed in U.S. Pat. Nos. 8,123,022 and/or 6,213,287, both of which are hereby incorporated by reference herein in their entirety.

Tensioner Assembly Embodiments

Various tensioner assembly embodiments including a tensioner assembly 400 are described herein for biasing (e.g., selectively and/or adjustably biasing) the scraper blade 200 against the conveyor belt. The tensioner assembly 400 preferably applies a biasing moment to the pivot 110 (e.g., to one of the shaft portions 110-1, 110-2; in some embodiments two tensioner assemblies may separately apply a biasing moment to both shaft portions). The tensioner assembly 400 preferably includes a tension adjustment subassembly (e.g., a subassembly 500 of the illustrated embodiment) for selectively adjusting the biasing moment applied to the pivot 110. The tensioner assembly is preferably spring-biased (e.g., by a metal spring such as a torsion, tension or compression spring; or by another elastic element such as a rubber torsion tube). In some embodiments the tensioner assembly includes one or more torsion springs that may be disposed around an outer radius of the pivot 110 (or alternatively inside or adjacent to the pivot 110). In embodiments employing a torsion spring such as a metal torsion spring, the applied moment M may decrease at a different rate than for other spring types such as compression springs. In some embodiments, the tensioner assembly may include other biasing elements such as those disclosed in U.S. Pat. Nos. 5,385,507 and/or 5,865,997, both of which are hereby incorporated by reference in their entirety.

Referring to FIGS. 7-10, the illustrated embodiment of a tensioner assembly 400 is shown in more detail. The shaft portion 110-2 (see FIG. 1) preferably extends through the tensioner assembly 400. The shaft portion 110-2 is preferably coupled (e.g., rigidly, co-axially) to a sleeve 145, e.g., using one or more set screws 146 threaded into radially arranged threaded openings in the sleeve. The pivot 110 and the scraper blade 200 are thus preferably constrained to pivot (e.g., rigidly) with the sleeve 145 (e.g., about the pivot axis A). One or more torsion springs 450 (e.g., a right-hand wound torsion springs, which may be made of metal) are preferably disposed around (e.g., coiled around) the outer radius of the shaft portion 110-2. In the illustrated embodiment, two torsion springs 450a, 450b are disposed around the shaft portion 110-2; in other embodiments, the tensioner assembly 400 may include a single torsion spring 450. A first spring portion 452 (e.g., a first end portion, a radially outwardly extending portion) of each torsion spring 450 is preferably coupled (e.g., releasably coupled, operably coupled) to the sleeve 145. In the illustrated embodiment, the spring 450 is releasably operably coupled to the sleeve 145 by a spring coupler 148. The spring coupler 148 is preferably rigidly mounted to the sleeve 145 (e.g., by welding). The spring coupler 148 preferably includes an opening 149 (e.g., a hole as illustrated, or a notch) for at least partially receiving the first spring portion 452 and/or for transmitting a biasing force from the spring portion 452 to the spring coupler 148. Increasing tension of (e.g., tightening) the spring 450 tends to increase the biasing force transmitted to the spring coupler 148 and thus increase the biasing moment applied to the pivot 110 and the scraper blade 200.

A tension adjustment subassembly 500 is preferably configured to adjust (e.g., selectively adjust) the tension in the spring 450. A user interface 528 (e.g., a nut as illustrated, or a wingnut, dial, knob, lever or other suitable adjustment device) is preferably operably coupled (e.g., by a shaft 527) to a gear 520. The gear 520 preferably comprises gear teeth extending at least partially around a circumference thereof. Rotation of user interface 528 preferably causes gear 520 to rotate.

Gear 520 preferably engages a gear 530 such that rotation of gear 520 results in rotation (e.g., counter-directional rotation) of gear 530. The gear 530 preferably comprises gear teeth extending at least partially around a circumference thereof. The gear 530 preferably has a greater diameter than the gear 520; rotation of gear 520 through a first angle preferably rotates the gear 530 through a second, smaller-magnitude angle. The gear 530 preferably pivots about the pivot axis A. In some embodiments, the user interface 528 may engage the gear 530 directly. In some embodiments the gear 520 (and/or the gear 530, and/or the combination of gears 520, 530) functions as a ratchet and may comprise a two-way or one-way ratchet.

A spring coupler 532 is preferably operably coupled (e.g., welded to or bolted to) the gear 530. The spring coupler 532 preferably releasably engages a second spring portion 454 (e.g., a second end portion, an outwardly extending portion). The spring coupler 532 may include an opening 533 (e.g., a hole as shown or a notch) sized to receive the second spring portion 454. Rotation of gear 530 preferably causes the spring coupler 532 to rotate (e.g., about the pivot axis A), thus modifying the tension in the spring 450.

The tension adjustment subassembly 500 preferably includes a gear lock interface 510 (e.g., a knob as illustrated or a lever or other adjustment device). In the illustrated embodiment, gear lock interface 510 comprises a knob supported by a collar 512. The collar 512 may be supported by a transverse support 460. Gear lock interface 510 is preferably mounted to a gear interface 518 (e.g., plunger, pawl). The gear interface 518 may be biased into engagement with (e.g., between teeth of) a gear 520 (e.g., reduction gear, idler gear) by a compression spring 514. An angled surface 519 of the gear interface 518 preferably permits a tooth of the gear 520 to move (e.g., "click") past the gear interface in a first rotational direction (e.g., counterclockwise on the view of FIG. 10) by temporarily slidingly displacing the gear interface upward. After one or more teeth of gear 520 moves past the gear interface 518 along the first rotational direction, the spring 514 preferably decompresses and reengages the gear interface with (e.g., inserts between teeth of) the gear 520 such that a surface 517 (e.g., a vertical surface) of the gear interface prevents the gear 520 from rotating along a second, opposing rotational direction (e.g., clockwise on the view of FIG. 10).

For maintenance, installation or removal purposes, a selective adjustment (e.g., upward displacement) of the gear lock interface 510 preferably disengages the gear interface 518 from the gear 520 and permits the scraper blade 200 to pivot freely about the axis A.

The tensioner assembly 400 preferably comprises mounting plate 140, sidewall 420 and an internal support wall 430. The mounting plate 140, sidewall 420 and an internal support wall 430 are preferably substantially parallel and preferably disposed generally normal to the pivot axis A. The mounting plate 140, sidewall 420 and an internal support wall 430 may be made of one or more metals such as aluminum or steel, or in other embodiments may be made of a polymer. Transverse supports 460, 470 are preferably mounted (e.g., by welding or by fasteners) to the upper and lower ends, respectively, of mounting plate 140, sidewall 420 and an internal support wall 430. Transverse supports 460, 470 preferably comprise transversely extending bars or plates and may be made of a metal such as aluminum or steel, or in other embodiments may be made of a polymer.

Shaft portion 110-1 is preferably supported by (and/or extends through) a bushing 124. Bushing 124 is preferably seated in an opening in the mounting plate 120. Bushing 124 may be removably fastened to the mounting plate 120 using screws, bolts or other fasteners.

Shaft portion 110-2 is preferably supported by (and/or extends through) a bushing 412. Bushing 412 is preferably seated in an opening in the mounting plate 140. Bushing 412 may be removably fastened to the mounting plate 140 using screws 413, bolts or other fasteners. The spring or springs 450 and the shaft portion 110-2 preferably extend through an opening 431 in internal support wall 430. A mounting collar 432 is preferably seated in the opening 431. A bushing 434 is preferably supported by the mounting collar 432. The bushing 434 preferably supports the gear 530.

Shaft portion 110-2 preferably extends through an opening 421 in sidewall 420. A bushing 422 is preferably seated in the opening 421 in the sidewall 420. Bushing 422 may be removably mounted to the sidewall 420 by screws 423 or other fasteners. The sleeve 145 is preferably supported (e.g., pivotally supported) by the bushing 422.

The shaft 527 is preferably supported (e.g., pivotally supported) by a bushing 526. The bushing 526 is preferably seated in an opening 433 in the internal support wall 430. The gear 520 is preferably rigidly coupled to an inboard end of the shaft 527 and/or to the bushing 526 such that the gear 520 rotates with the shaft 527. The shaft 527 is preferably rigidly coupled at an outboard end 525 thereof to the user interface 528. In the illustrated embodiment, the outboard end 525 of the shaft 527 is received within the user interface 528 and is preferably selectively rigidly coupled to the user interface (e.g., by threading or by a removable pin). The outboard end 525 and/or the user interface 525 are preferably supported (e.g., pivotally supported) by an opening 427 in the sidewall 420.

A rearward cover 496 and a forward cover 490 preferably cooperate with the mounting plate 140 and sidewall 420 to substantially enclose the spring 450. The cover 490 and/or the cover 496 are preferably removably fastened to upper and lower transverse supports 460, 470. In some embodiments, the covers are fastened to the transverse supports by removable fasteners 492 (e.g., screws as illustrated or other fastening devices). In some embodiments, the sidewall 420 is additionally or alternatively selectively removable from the remainder of the tensioner assembly 400.

Ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents.

The invention claimed is:

1. A conveyor belt cleaner, comprising:
    a scraper blade, the scraper blade comprising:
        a rearward face;
        a forward face; and
        an initial contact surface extending between said forward face and said rearward face, wherein wear of said scraper blade sequentially exposes a first subsequent contact surface having a first cleaning angle and a second subsequent contact surface having a second cleaning angle, wherein said first and second cleaning angles are within an operationally effective cleaning angle range;
    a tensioning assembly, the tensioning assembly comprising a torsion spring applying a moment to said scraper blade about a pivot axis; and
    a tension adjustment subassembly, said tension adjustment subassembly comprising:
        a gear, said gear having a rotational axis offset from and parallel to the pivot axis, wherein rotation of said gear modifies a tension in said torsion spring; and
        a gear lock interface, said gear lock interface resiliently biased into engagement with said gear.

2. The conveyor belt cleaner of claim 1, wherein said first cleaning angle is measured between a first plane tangential to said forward face and a second plane tangential to said first subsequent contact surface, and wherein said second cleaning angle is measured between a third plane tangential to said forward face and a fourth plane tangential to said second subsequent contact surface.

3. The conveyor belt cleaner of claim 1, wherein wear of said scraper blade between said initial contact surface and said first subsequent contact surface results in removal of a first substantial volumetric portion of said scraper blade, and wherein wear of said scraper blade between said first subsequent contact surface and said second subsequent contact surface results in removal of a second substantial volumetric portion of said scraper blade.

4. The conveyor belt cleaner of claim 1, wherein said operationally effective cleaning angle range is between about 90% and about 110% of said first cleaning angle.

5. The conveyor belt cleaner of claim 1, wherein said initial contact surface is configured to engage a conveyor belt portion rounding a pulley.

6. The conveyor belt cleaner of claim 1, wherein said tensioning assembly is supported on an outboard shaft portion, said outboard shaft portion extending outboard of said scraper blade, and wherein said torsion spring extends around an outer radius of said outboard shaft portion.

7. The conveyor belt cleaner of claim 1, wherein said initial contact surface has an initial cleaning angle, wherein said initial cleaning angle is substantially greater than said first cleaning angle.

8. The conveyor belt cleaner of claim 1, wherein said scraper blade has a minimum thickness extending between said forward face and said rearward face, wherein said minimum thickness is greater than about 2 inches.

9. The conveyor belt cleaner of claim 1, wherein a first pressure is applied to said first subsequent contact surface and a second pressure is applied to said second subsequent contact surface, wherein wear of said scraper blade cooperates with a reduction of said moment applied by said torsion spring to retain said first pressure and said second pressure within an operationally effective pressure range.

10. The conveyor belt cleaner of claim 9, wherein said operationally effective pressure range is between about 90% and about 110% of an average pressure applied to said scraper blade at said first and second subsequent contact surfaces.

11. The conveyor belt cleaner of claim 1, wherein said scraper blade comprises a plurality of selectively removable scraper blade segments, wherein said scraper blade segments are arranged in side-by-side relation.

12. A conveyor belt cleaner, comprising:
a scraper blade, the scraper blade comprising:
    a rearward face;
    a forward face; and
    an initial contact surface extending between said forward face and said rearward face, wherein wear of said scraper blade sequentially exposes a first subsequent contact surface and a second subsequent contact surface, wherein a first pressure is applied to said first subsequent contact surface, wherein a second pressure is applied to said second subsequent contact surface; and
a tensioning assembly, the tensioning assembly comprising:
    a torsion spring applying a moment to said scraper blade about a pivot axis, wherein wear of said scraper blade cooperates with a reduction of said moment applied by said torsion spring to retain said first pressure and said second pressure within an operationally effective pressure range;
    a gear having a rotational axis, wherein said rotational axis of said gear is offset from the pivot axis; and
    a gear lock interface having a first configuration and a second configuration, wherein in said first configuration the gear lock interface is biased into engagement with the gear, wherein in said second configuration the scraper blade is permitted to pivot freely.

13. The conveyor belt cleaner of claim 12, wherein said operationally effective pressure range is between about 90% and about 110% of an average pressure applied to said scraper blade at said first and second subsequent contact surfaces.

14. The conveyor belt cleaner of claim 12, further comprising a tension adjustment subassembly, wherein said tension adjustment subassembly selectively modifies a tension in said torsion spring.

15. The conveyor belt cleaner of claim 12, wherein said tensioning assembly is supported on a first outboard shaft portion, said first outboard shaft portion extending outboard of said scraper blade on a first side of said scraper blade, and wherein said torsion spring extends around an outer radius of said outboard shaft portion.

16. The conveyor belt cleaner of claim 15, further comprising:
    a transversely extending blade support member, said scraper blade being removably mounted to said transversely extending blade support member;
    a second outboard shaft portion, said second outboard shaft portion extending outboard of said scraper blade on a second side of said scraper blade, wherein said first and second outboard shaft portions are removably mounted to said blade support member, and wherein said first and second outboard shaft portions comprise separate coaxial shafts;
    a first bolt removably securing said first outboard shaft portion to said blade support member; and
    a second bolt removably securing said second outboard shaft portion to said blade support member, wherein said first and second bolts extend at least partially through and outwardly from said blade support member.

17. The conveyor belt cleaner of claim 16, wherein said scraper blade comprises a plurality of selectively removable scraper blade segments, wherein said scraper blade segments are arranged in side-by-side relation.

18. The conveyor belt cleaner of claim 17, further comprising:
    a transversely extending rail mounted to a surface of said blade support member; and
    a plurality of blade attachment brackets slidingly supported on said rail, wherein each said scraper blade segment is mounted to said blade support member by one of said plurality of blade attachment brackets.

19. The conveyor belt cleaner of claim 12, wherein said scraper blade has a minimum thickness extending between said forward face and said rearward face, wherein said minimum thickness is greater than about 2 inches.

20. The conveyor belt of claim 12, wherein said initial contact surface has a height, wherein said scraper blade has a minimum thickness extending between said forward face and said rearward face, and wherein a ratio between said height and said minimum thickness is between 1.2 and 1.8.

* * * * *